(12) United States Patent
Segawa

(10) Patent No.: US 6,502,061 B1
(45) Date of Patent: Dec. 31, 2002

(54) METHOD AND DEVICE FOR INFORMATION PROCESSING AND PROGRAM PROVIDING MEDIUM

(75) Inventor: Hiroyuki Segawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/674,766

(22) PCT Filed: Mar. 6, 2000

(86) PCT No.: PCT/JP99/01350

§ 371 (c)(1),
(2), (4) Date: Nov. 3, 2000

(87) PCT Pub. No.: WO00/52535

PCT Pub. Date: Sep. 8, 2000

(30) Foreign Application Priority Data

Mar. 4, 1999 (JP) .......................................... 11-057691
Mar. 5, 1999 (JP) .......................................... 11-059355

(51) Int. Cl.[7] .................................................. G06F 3/00

(52) U.S. Cl. ....................... 702/181; 702/147; 702/179; 702/181; 702/182; 702/183

(58) Field of Search ................................. 702/147, 179, 702/181, 182, 183, 189, 190; 382/100, 118

(56) References Cited

U.S. PATENT DOCUMENTS

| | | | |
|---|---|---|---|
| 5,726,905 A | * 3/1998 | Yazici et al. | 364/492 |
| 5,845,237 A | * 12/1998 | Puel et al. | 702/179 |
| 6,023,668 A | * 2/2000 | Genoux | 702/187 |
| 6,341,257 B1 | * 1/2002 | Haaland | 702/27 |

OTHER PUBLICATIONS

Toru Katayama, "Ouyou Kalman filter", Asakura Shoten, Apr. 20 1983, pp. 71–89, pp. 116–129.
Nobutaka Shimada, et al., "Shape and Pose Estimation of an Articulated Object from a Monocular Image Sequence Based on Loose Constraints", Journal, The Institute of Electronics, Information and Communication Engineers, Jan. 25 1998, vol. J81–D–II, No. 1, pp. 45–53.
Hiroyuki Segawa, et al., "Torque–based Recursive Filtering Approach to the Recovery of 3D Articulated Motion from Image Sequences", Proceedings 1999 EIEEE Computer Society Technical Committee on Computer Vision and Pattern Recognition vol. Two, IEEE Computer Society Technical Committee on Pattern Analysis and Machine Intelligence, IEEE Computer Society, (23.06.99), vol. 2, pp. 340–345.

* cited by examiner

Primary Examiner—Marc S. Hoff
Assistant Examiner—Felix Suarez
(74) Attorney, Agent, or Firm—Bell, Boyd & Lloyd LLC

(57) ABSTRACT

In estimating a state variable of a target on the basis of a previously estimated state variable and an observation value, a prediction value of a next state variable is found on the basis of the previously estimated state variable by a prediction process pre, and the state variable is updated by a first update process ed on the basis of the resultant prediction value and the observation value so as to find an update value. By a second update process opt, whether the update value meets the boundary condition or not is checked, and when the update value does not meet the boundary condition, a new update value is found which minimizes the Mahalanobis distance from the prediction value in the state space and the square sum or the absolute value sum of the Mahalanobis distance from the observation value in the observation space under the boundary condition. Thus, a parameter of motion information or the like of the target can be optimally estimated under the boundary condition or constraint.

30 Claims, 18 Drawing Sheets

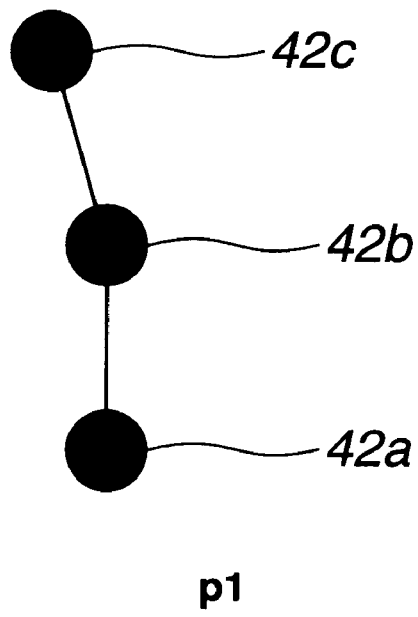
p1
FIG.5A
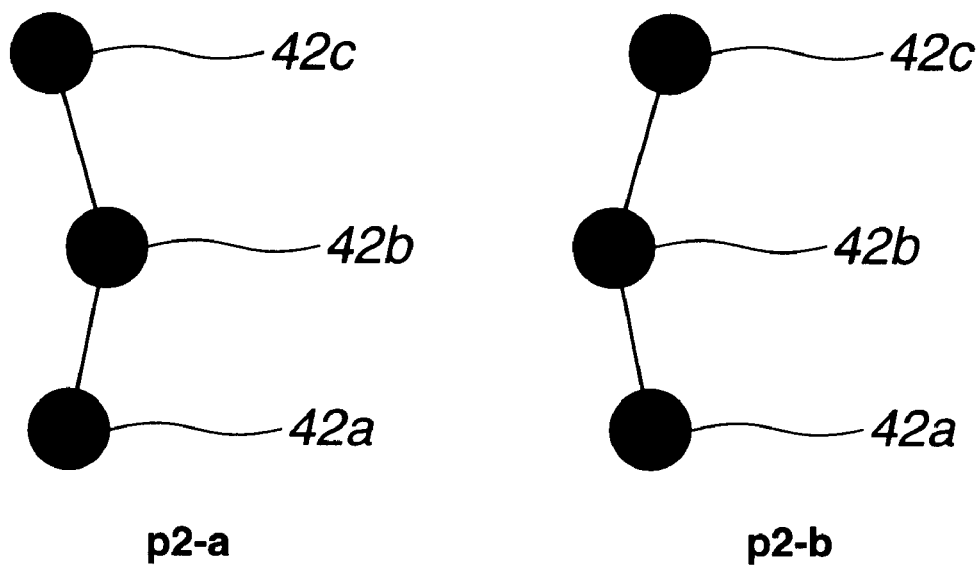
p2-a      p2-b
FIG.5B      FIG.5C

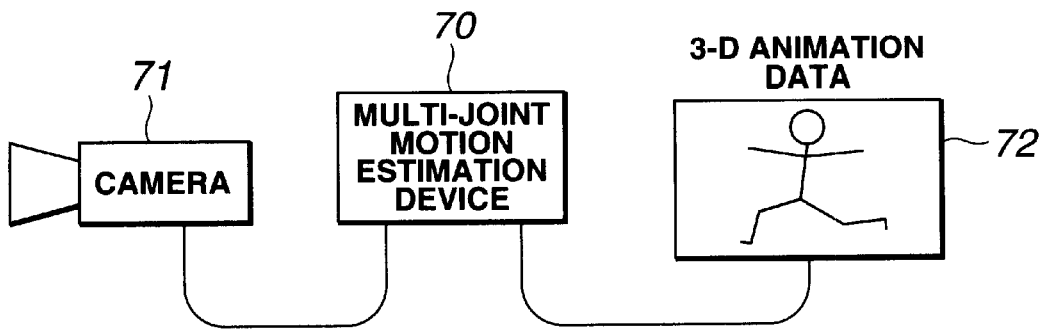
FIG.24
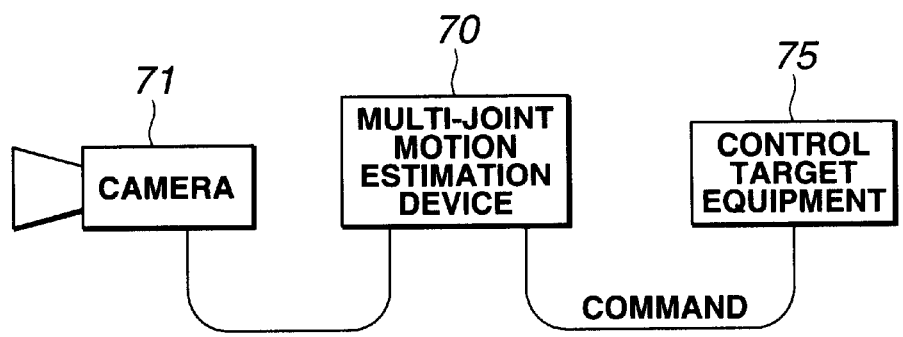
FIG.25A
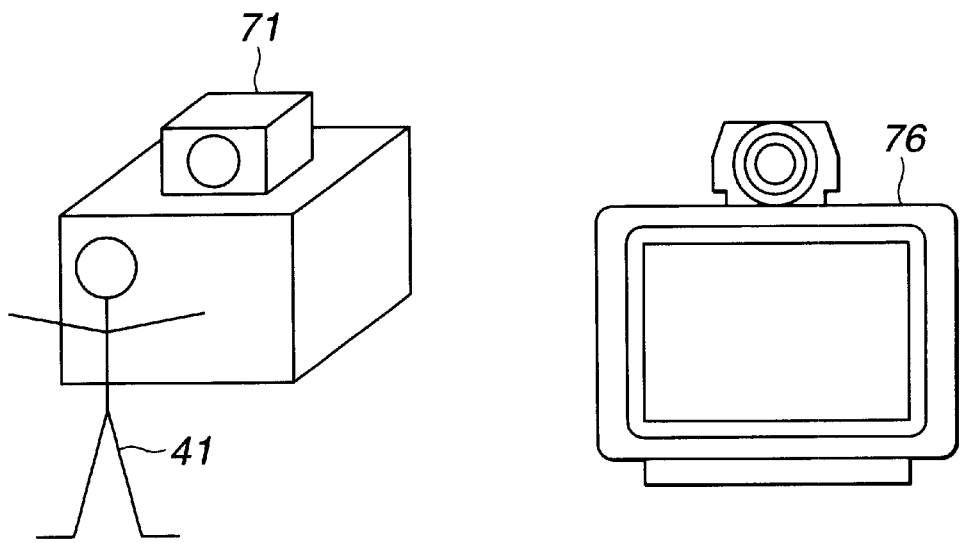
FIG.25B  FIG.25C

METHOD AND DEVICE FOR INFORMATION PROCESSING AND PROGRAM PROVIDING MEDIUM

TECHNICAL FIELD

This invention relates to an information processing method and device, and a program supply medium. Particularly, it relates to an information processing method and device for estimating or measuring a parameter using observation data, and a program supply medium for supplying a processing program based on the estimation or measurement method.

BACKGROUND ART

In a system for measuring or estimating a parameter of a target system using observation data as an input, because of uncertainty (noise component) of input data or insufficiency of observation data for the parameter to be estimated, the value of the parameter to be estimated is often inappropriate with respect to the actual parameter.

In order to solve this problem, the Kalman filter or a filter for recursive estimation derived therefrom is used, which is described in R. E. Kalman, "A New Approach to Linear Filtering and Prediction Problems", Trans. ASME-J. Basic Eng., pp.35–45, March 1960.

As the filter for recursive estimation, the Kalman filter is frequently used for a linear system. For an application with a nonlinear system, the extension of the Kalman filter or EKF is the best known filter. This extension of Kahnan filter (EKF) is described in A. Gelb, "Applied Optical Estimation", The Analytic Science Corp., 1974. Also, there are employed the unscented filter, described in S. J. Julier, et al., "A New Extension of the Kalman Filter to Nonlinear Systems", Proc. Of AeroSense: The 11th International Symposium on Aerospace/Defense Sensing, Simulation and Control", and the pseudo Kalman filter, described in T. Vileville and P. Sanders, "Using Pseudo Kalman Filters in the Presence of Constraints, Application to Sensing Behaviours", Technical Report 1669, INRIA-Sophia, Valbonne, France, 1992.

While the recursive estimation filter such as the Kalman filter is adapted for estimating the current state variable (parameter) using the current observation value, there is also known a smoother for estimating the past state variable using the current observation value. Hereinafter, the recursive estimation filter such as the Kalman filter will be first described and then the smoother will be described.

The Kalman filter has an efficient minimum square method mounted thereon and is capable of estimating the past, current and future states. It is also capable of estimating a state variable which lacks information and is capable of updating not only the state variable to be estimated but also the error covariance value representing the accuracy of estimation. Therefore, it is known as a robust estimation method.

The Kalman filter is one of the recursive estimation filters. The recursive estimation filter constantly updates the estimation value using only the latest data from continuously inputted observation values. FIG. 1 shows the schematic structure of the recursive estimation filter. This recursive estimation filter includes a prediction section 131 for predicting a motion and an update section 132 for updating predicted data, and carries out estimation by alternately repeating prediction at the prediction section 131 and update at the update section 132.

FIG. 2 is a block diagram showing the schematic structure of a Kalman filter 120 as one recursive estimation filter. First, a set of state variables to be estimated is described as a state vector x. If there are n units of state variables, the state vector x is the n-th order vector. The state vector x of the k-th cycle (one cycle corresponds to the observation cycle) is described as the state vector $X_k$. The predication process for predicting the next state is expressed by the following equation (1). In the following equation, the vector is described with bold characters. The linear time differentiation of the vector is described with a dot (.) attached to its upper part, and the quadratic time differentiation is described with two dots (..) attached to its upper part.

$$X_{k+1} = A_k x_k + W_k \quad (1)$$

In this case, the matrix $A_k$ is a state transition matrix of the k-th cycle, which is an n×n matrix. $w_k$ represents the prediction process noise generated in the prediction process and is assumed to be the normally distributed Gaussian noise.

The observation process is expressed by the following equation (2).

$$y_k = H_k x_k + v_k \quad (2)$$

The covariance matrices of the process noise generated in the processes of the equations (1) and (2) are described as $Q_k$ and $P_k$, respectively.

In the equation (2), $y_k$ represents the observation vector, which represents the vector of a set of observation values of the k-th cycle, and $H_k$ represents the observation matrix of the k-th cycle. The observation vector $y_k$ need not be of the same order as the state vector. If it is assumed that the observation vector $y_k$ is of the m-th order, the observation matrix $H_k$ is an m×n matrix. $v_k$ represents the observation noise generated in the observation process, which is assumed to be the Gaussian noise.

The Kalnan filter 120 repeats prediction and update so as to carry out estimation. In this case, the state vector estimated before update is described by the following formula (3) and the estimated state vector after update is described by the following formula (4).

$$\hat{x}^-_k \quad (3)$$

$$\hat{x}_k \quad (4)$$

The hat mark (^) attached to the upper part in the formulas (3) and (4) indicates that it is an estimation value. In the following text, however, description of $x^-_k(\hat{})$ and $x_k(\hat{})$ is used.

The above-described $P_k$ is assumed to represent the estimated error covariance after update. The estimated error covariance before update is described by the following formula (5).

$$P^-_k \quad (5)$$

On the foregoing assumption, the processing at the prediction section 131 will be described. As shown in FIG. 2, in the processing e1 at the prediction section 131, the following prediction of the state is carried out on the basis of the equation (6).

$$\hat{x}^-_k = A_{k-1} \hat{x}_{k-1} \quad (6)$$

In the processing e2 at the prediction section 131, the following estimated error covariance $P^-_k$ is carried out on the basis of the equation (7).

$$P^-_k = A_{k-1} P_{k-1} A_{k-1}^T + Q_{k-1} \quad (7)$$

In this equation, $A_{k-1}^T$ represents the transported matrix of the state transition matrix $A_{k-1}$.

Next, the processing at the update section 132 will be described. In the processing c1 at the update section 132, the Kalman gain $K_k$ is calculated on the basis of the following equation (8).

$$K_k = P^-_k H_k^T (H_k P^-_k H_k^T + R_k)^{-1} \quad (8)$$

In this equation, $H_k^T$ represents the transported matrix of the observation matrix $H_k$ and $(\ )^{-1}$ represents the inverse matrix of the matrix within $(\ )$.

In the processing c2 at the update section 132, estimation of the state variable is updated on the basis of the following equation (9) using the observation value inputted to the update section 132.

$$\hat{x}_k = \hat{x}^-_k + K_k(y_k - H_k \hat{x}^-_k) \quad (9)$$

In the processing c3 at the update section 132, the estimated error covariance $P_k$ is updated on the basis of the following equation (10).

$$P_k = (I - K_k H_k) P^-_k \quad (10)$$

In this equation, I represents the unit matrix of the n×n dimension.

With the Kalman filter 120 as described above, it is assumed that both the prediction process and the observation process are linear. Actually, however, these processes are often nonlinear. In order to cope with this, a derived filter such as the above-described EKF (extension of the Kalman filter) is proposed. The most frequently used EKF will now be described.

In the EKF, the prediction process is expressed by the following equation (11) (corresponding to the formula (1) of the Kalman filter 120), and the observation process is expressed by the following equation (12) (corresponding to the equation of the Kalman filter 120).

$$x_{k+1} = f(x_k) + w_k \quad (11)$$

$$y_k = h(x_k) + v_k \quad (12)$$

In this case, f represents the nonlinear state transition matrix and h represents the nonlinear observation matrix.

With respect to the actual estimation framnework in the EKF, the processing corresponding to the processing e1 of the Kalman filter 120 (FIG. 2) is expressed by the following equation (13).

$$\hat{x}^-_k = f(\hat{x}_{k-1}) \quad (13)$$

The processing corresponding the processing e2 of the Kalman filter 120 (FIG. 2) is expressed by the following equation (14).

$$\hat{x}_k = \hat{x}^-_k + K_k(y_k - h(\hat{x}^-_k)) \quad (14)$$

The state transition matrix $A_k$ is expressed by the following equation (15) and the observation matrix $H_k$ is expressed by the following equation (16).

$$A_{k(i,j)} = \frac{\partial f_{(i)}(\hat{x}_k)}{\partial x_{k(j)}} \quad (15)$$

-continued $$H_{k(i,j)} = \frac{\partial h_{(i)}(\hat{x}_k)}{\partial x_{k(j)}} \quad (16)$$

In this case, $A_{k(i,j)}$ represents the matrix elements of the i-th row and the j-th column of the state transition matrix $A_k$, and is calculated by partially differentiating the i-component of the function f with the j-component of the state variable $x_k$. $H_{k(i,j)}$ represents the matrix elements of the i-th row and the j-th colm-n of the observation matrix $H_k$, and is calculated by partially differentiating the i-component of the function h with the j-component of the state variable $x_k$. Except for these features, the EKF is similar to the Kalman filter 120.

In filtering by the Kalman filter or the like as described above, the current state variable (parameter) is estimated by using the current observation value, but the estimation value might be affected by a sudden large noise. On the other hand, in smoothing, the past state variable (parameter) is estimated by using the current observation value. The Kalman smoother utilizing the technique of the Kalman filter is technically established already. The smoother is described in: Toru Katayama, "Applied Kalman Filter", Asakura Shoten; Gelb ed., "Applied Optimal Estimation", MIT Press; and R. G. Brown and P. Y. Hwang, "Introduction to Random Signals and Applied Kalman Filtering", John Wiley & Sons, Inc.

Using the smoother, robustness against any sudden change of the observation value is realized. In the case where the observation data is degenerated, the accuracy is often improved by smoothing even though estimation by filtering is difficult.

As such smoother, there are three types, that is, a fixed-point smoother, a fixed-interval smoother and a fixed-lag smoother which are suitable for different applications in accordance with their respective characteristics. The fixed-point smoother is suitable for estimation of an initial value, and the fixed-interval smoother is suitable for batch processing after gathering of a set of time series data. The fixed-lag smoother is characterized in that the parameter is estimated constantly with a lag of a predetermined period (time period L) with respect to the observation data. That is, it is a smoother for estimating the state variable of the time period t–L by using the observation data obtained during the time period t. By using this, substantially real-tune processing can be carried out in a system which allows a predetermined delay. For example, in the case where processing is carried out by the fixed-lag smoother using observation data obtained from an NTSC image, if there is a lag L=10 frames, a delay of 1/30×10=1/3 seconds or more is simply generated. In a system which allows this delay, the smoother for improving the estimation accuracy is useful.

However, in the above-described conventional technique, when a boundary condition is added to the parameter as the estimation target, it is impossible or very difficult to take that condition into consideration with the Kalman filter.

Specifically, with the conventional recursive estimation filter such as the Kalman filter or the Kalnan smoother having the Kalnan filter operating inside thereof, only the optimal estimation value in a state space having no constraint can be found. With the pseudo Kalman filter described in T. Vileville and P. Sanders, "Using Pseudo Kalman Filters in the Presence of Constraints, Application to Sensing Behaviours", Technical Report 1669, INRIA-Sophia, Valbonne, France, 1992, optimal estimation under a constraint expressed by an equation, but a constraint expressed by an inequality and a boundary condition cannot be handled. Strictly, on the assumption that the resolution is known to be necessarily present on the boundary in an inequality or under a boundary condition, the pseudo Kabnan filter can handle the constraint expressed by the inequality and the boundary condition. However, such assumption is not necessarily secured for all problems.

Therefore, even when the state variable has a boundary condition, it is not guaranteed at all that the estimation value from the conventional recursive filter falls within the condition or that the resultant estimation value is the optimum value. The Kalman smoother cannot handle a boundary condition since it basically causes the Kalman filter to operate inside thereof.

A specific example in which a constraint is necessary will now be described with reference to FIG. 3. In FIG. 3, it is assumed that an arm 42 of a target or an object (person) 41 is observed from a direction p (direction from the right lateral side of the object 41) and from a direction i perpendicular to the direction p. The arm 42 in FIG. 3 includes a wrist joint 42a, an elbow joint 42b and a shoulder joint 42c. FIGS. 4A and 4B show a continuous change from an image i1 to an image i2 in the case where the arm 42 of the object 41 in FIG. 3 is observed from the direction i. An image p1 of FIG. 5A and an image p2-a of FIG. 5B show the images of the arm 42 of the object 41 in the case where it is picked up from the direction p when the image i1 of FIG. 4A and the image i2 of FIG. 4B are observed. In the case where the data of the image p1 of FIG. 5A is correctly estimated with respect to the data of the image i1 of FIG. 4A and where the image p2-a of FIG. 5B corresponds to the actual posture with respect to the data of the image i2 of, the actual posture might be erroneously estimated as an image p2-b of FIG. 5C if the prediction process is not appropriate.

Thus, the estimation system might return the image p2-b as the estimation value. This is because two-dimensional information lacks information of depth. However, since it is known that the elbow cannot be bent in the reverse direction, the solution that the image p2-a corresponds to the actual posture can be obtained on the basis of that knowledge. The conventional recursive filter cannot return the optimum value under such boundary condition, and the smoother using such recursive filter cannot carry out optimal estimation, either.

It is also conceivable to apply the smoother for multi-joint motion estimation. However, it is necessary to consider what parameter should be the estimation target for prediction of a precise motion.

DISCLOSURE OF THE INVENTION

In view of the foregoing status of the art, it is an object of the present invention to provide an information processing method and device and a program supply medium which enable effective processing even in the case where an estimation target parameter has a boundary condition with respect to a recursive estimation filter for predicting a state variable (parameter) such as motion information of an object.

It is another object of the present invention to provide an information processing method and device and a program supply medium which enable effective processing even in the case where an estimation target parameter has a boundary condition with respect to a recursive smoother for estimating the past state variable (parameter) from the current observation value and which enable more precise parameter estimation in application to multi-joint motion estimation or the like.

In an information processing method and device according to the present invention, when estimating a state variable of a target on the basis of a previously estimated state variable and an observation value, a prediction value of a next state variable is found on the basis of the previously estimated state variable, and the state variable is updated on the basis of the found prediction value and the observation value so as to obtain an update value and output the update value as an estimation value. As the update value, depending on the case, an update value is used which minimizes the Mahalanobis distance from the prediction value in the state space and the square sum or the absolute value sum of the Mahalanobis distance from the observation value in the observation space under a boundary condition.

In this case, the update value of the state variable is found on the basis of the prediction value and the observation value, and it is checked whether the resultant update value meets the boundary condition or not. When the update value does not meet the boundary condition, a new update value is found which minimizes the Mahalanobis distance from the prediction value in the state space and the square sum or the absolute value sum of the Mahalanobis distance from the observation value in the observation space under the boundary condition. A minimum square method is applied to the case where the estimation target parameter (state variable) has a boundary condition. To find an update value under the restraining condition, quadratic programming or nonlinear programming is used.

Thus, the state variable of motion information or torque of a multi-joint object can be estimated under the restraining condition such as a boundary condition.

Also, in an information processing method and device according to the present invention, when estimating a state variable at a predetermined position on the time base with respect to a target on the basis of a previously estimated state variable and an observation value, filtering processing is sequentially repeated L times, including processing for finding a prediction value of the state variable at that time point on the basis of an update value of a state variable immediately before and for finding an update value which minimizes the Mahalanobis distance from the prediction value in the state space and the square sum or the absolute value sum of the Mahalanobis distance from the observation value in the observation space under a boundary condition. The state variable at the predetermined position on the time base is estimated on the basis of the value obtained in the filtering processing of each time.

The filtering processing is sequentially carried out over a predetermined range from the predetermined position on the time base to the future.

As the filtering processing, the prediction value of the state variable at that time point is found on the basis of the update value of the state variable immediately before, and the update value of the state variable is found on the basis of the resultant prediction value and the observation value at that time point. Whether the update value meets the boundary condition or not is checked. When the update value does not meet the boundary condition, a new update value is found which minimizes the Mahalanobis distance from the prediction value in the state space and the square sum or the absolute value sum of the Mahalanobis distance from the observation value in the observation space under the boundary condition.

In an information processing method and device according to the present invention, when estimating a state variable at a predetermined position on the time base with respect to a target on the basis of an estimation value of a previously estimates state variable and an observation value, filtering processing is sequentially repeated L times, including processing for finding a prediction value of motion information and a prediction value of torque of the target at that time point on the basis of an update value of motion information and an update value of torque of the target immediately before and for finding the update value of motion information and the update value of torque at that time point on the basis of the resultant prediction values, the observation value of motion information of the target and the observation value of torque. The state variable at the predetermined position on the time base is estimated on the basis of the value obtained in the filtering processing of each time.

With the information processing method and device according to the present invention, when estimating a state variable of a target on the basis of a previously estimated state variable and an observation value, a prediction value of a next state variable is found on the basis of the previously estimated state variable, and the state variable is updated on the basis of the found prediction value and the observation value so as to obtain an update value and output the update value as an estimation value. As the update value, depending on the case, an update value is used which minimizes the Mahalanobis distance from the prediction value in the state space and the square sum or the absolute value sum of the Mahalanobis distance from the observation value in the observation space under a boundary condition. Thus, optimal estimation of the state variable can be carried out under the boundary condition.

Also, the first update value of the state variable is found on the basis of the prediction value and the observation value, and it is checked whether the resultant update value meets the boundary condition or not. When the update value does not meet the boundary condition, a new update value is found which minimizes the Mahalanobis distance from the prediction value in the state space and the square sum or the absolute value sum of the Mahalanobis distance from the observation value in the observation space under the boundary condition. Therefore, as the first update value is outputted as the estimation value in the case where the boundary condition is met, computation requiring large burden for finding the new estimation value is not necessary and the overall burden of the computational processing is reduced.

Moreover, with information processing method and device according to the present invention, when estimating a state variable at a predetermined position on the time base with respect to a target on the basis of a previously estimated state variable and an observation value, filtering processing is sequentially repeated L times, including processing for finding a prediction value of the state variable at that time point on the basis of an update value of a state variable immediately before and for finding an update value which minimizes the Mahalanobis distance from the prediction value in the state space and the square sum or the absolute value sum of the Mahalanobis distance from the observation value in the observation space under a boundary condition. The state variable at the predetermined position on the time base is estimated on the basis of the value obtained in the filtering processing of each time. Thus, optimal estimation of the state variable can be carried out under the boundary condition. Also, optimal estimation of the state variable (parameter) can be carried out with respect to an abrupt motion or a motion accompanying a sudden large noise.

In the filtering processing, the first update value of the state variable is found on the basis of the resultant prediction value and the observation value, and whether the update value meets the boundary condition or not is checked. When the update value does not meet the boundary condition, a new update value is found which minimizes the Mahalanobis distance from the prediction value in the state space and the square sum or the absolute value sum of the Mahalanobis distance from the observation value in the observation space under the boundary condition. Therefore, as the first update value is outputted as the estimation value in the case where the boundary condition is met, computation requiring large burden for finding the new estimation value is not necessary and the overall burden of the computational processing is reduced.

Also, with the information processing method and device according to the present invention, when estimating a state variable at a predetermined position on the time base with respect to a target on the basis of an estimation value of a previously estimates state variable and an observation value, filtering processing is sequentially repeated L times, including processing for finding a prediction value of motion information and a prediction value of torque of the target at that time point on the basis of an update value of motion information and an update value of torque of the target immediately before and for finding -the update value of motion information and the update value of torque at that time point on the basis of the resultant prediction values, the observation value of motion information of the target and the observation value of torque. The state variable at the predetermined position on the time base is estimated on the basis of the value obtained in the filtering processing of each time. Thus, more precise prediction of a motion is made possible. Specifically, since the prediction model more resembles the actual model, robust estimation can be carried out even in the case where there is a large change in the data parameter (state variable) of the sampled continuous data. For the same reason, the accuracy of estimation can be unproved.

Moreover, since estimation of the state variable is carried out by using motion information and torque information for the state variable, the motion information and torque information of a multi-joint object can be properly estimated under the boundary condition. The accuracy of estimation in the direction of depth can be improved, which was conventionally difficult in the motion estimation from a single-view image. It can be applied for the single-camera construction of an optical motion capture system (motion measurement system), which currently requires a plurality of cameras. Thus, the complicated operation such as calibration is not necessary. Also, three-dimensional motions of persons and animals can be reproduced from archives such as the past movie films and video pictures.

These effects can be obtained not only in the case where a single-view image sequence is used as an input but also in the case where images from a plurality of cameras or inputs from other sensors such as an angular speedometer and an angular accelerometer are used.

BRIEF DESCRIPTION OF THE DRAWINGS

FIGS. 5A to 5C illustrate the state of the arm of FIG. 3.

FIG. 24 is a block diagram showing an exemplary structure of a motion capture system.

FIGS. 25A to 25C are conceptual views showing another application in which the embodiment of the present invention is applied to a multi-joint motion estimation device.

BEST MODE FOR CARRYING OUT THE INVENTION

Preferred embodiments of the information processing method and device according to the present invention will now be described in detail with reference to the drawings.

Figure 1:
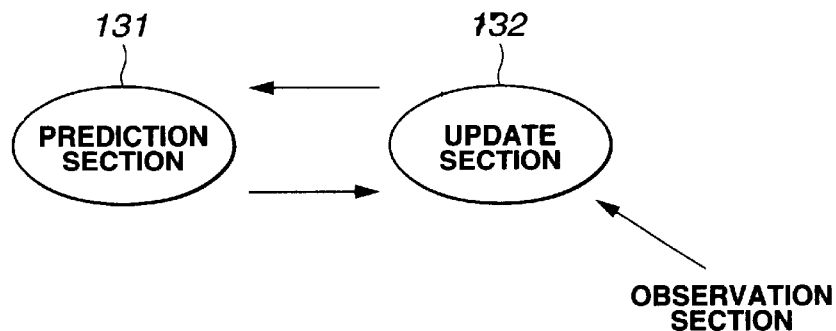
FIG. 1 is a block diagram showing an exemplary structure of a recursive estimation filter.
Figure 2:
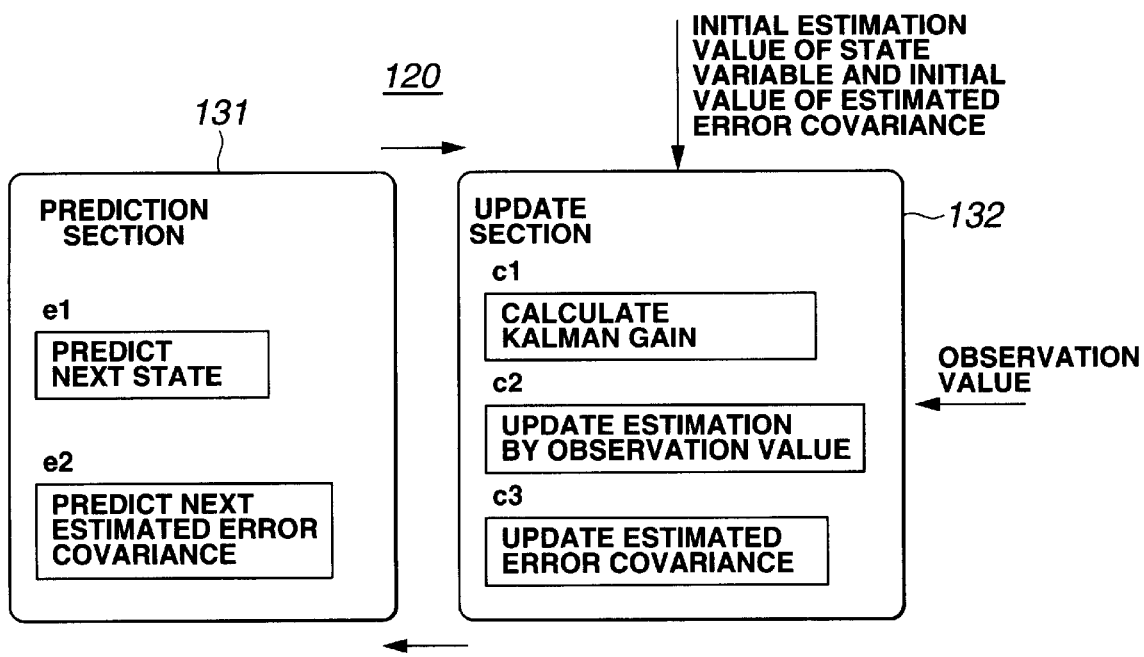
FIG. 2 illustrates the schematic structure and operation of the Kalman filter.
Figure 3:
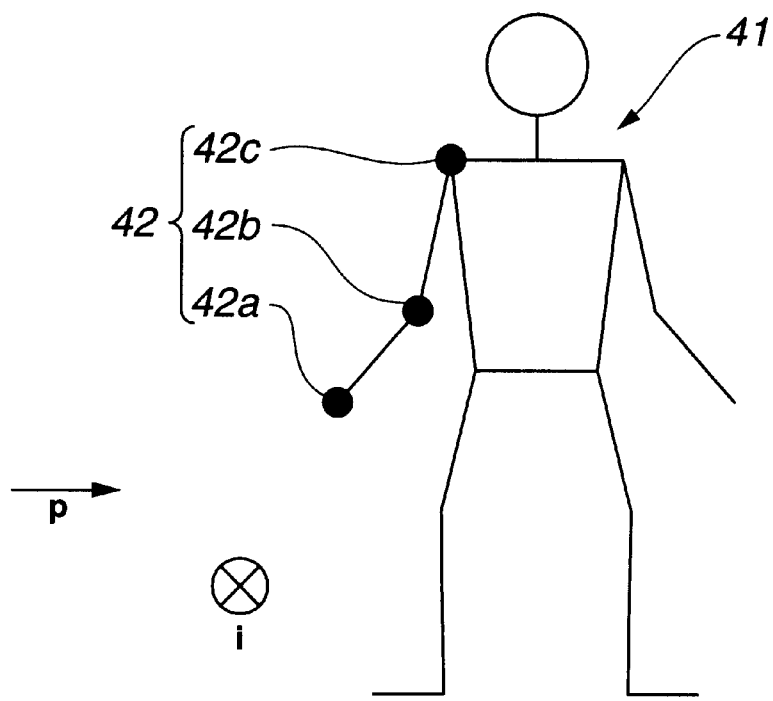
FIG. 3 schematically shows an arm of a human body as a target of parameter estimation.
Figure 4A:
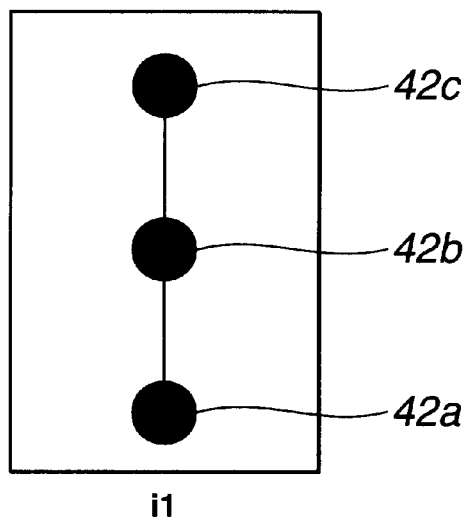
FIGS. 4A and 4B illustrate the state of the arm of FIG. 3.
Figure 4B:
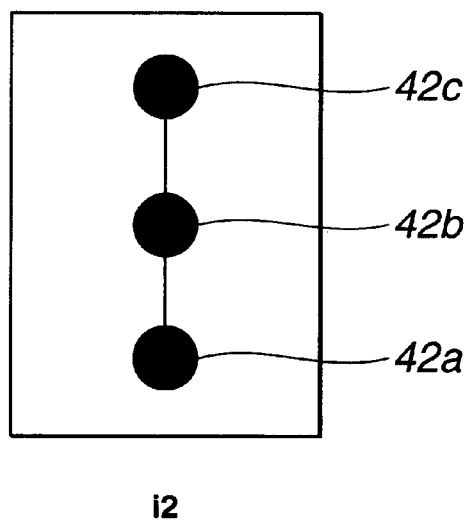
Figure 6:
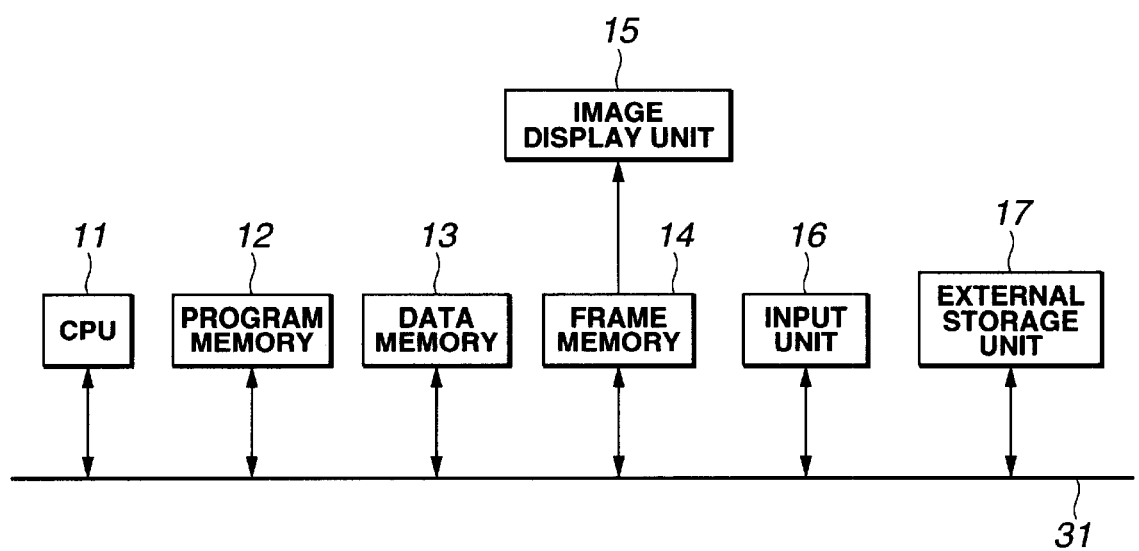
FIG. 6 is a block diagram showing the schematic structure of a parameter (state variable) estimation device according to an embodiment of the present invention.

FIG. 6 is a block diagram showing an exemplary structure of a parameter estimation device for estimating the state variable (parameter) of a target, or a smoother for estimating the past state variable (parameter) from the current observation value of the target, as an embodiment of the information processing method and device according to the present invention. The parameter estimation device or smoother having the structure of FIG. 6 is assumed to be applied particularly to a multi-joint motion estimation device, as will be described later.

In FIG. 6, a CPU 11 executes various kinds of processing in accordance with programs recorded in a program memory 12.

Various kinds of information including parameters are stored in a data memory 13. For example, in the case of multi-joint motion estimation, angle information, angular velocity information and torque information for estimating a motion are stored, as well as observation information necessary for updating the estimation value, and signals from a sensor or information from an image sequence. In a frame memory 14, the image sequence is stored if the image sequence is directly accessed as the observation information, or image information generated for visualizing an estimated three-dimensional parameter is stored.

An image display unit 15 displays the image information stored in the frame memory 14. An input unit 16 is used for operation input from a mouse or a keyboard, or for inputting an image or a sensor signal.

An external storage unit 17 stores the observation value or estimated information. As the external storage unit 17, a hard disk drive (HDD) or a randomly accessible storage medium like an optical disc is preferred. However, a storage medium such as a tape streamer which is not suitable for random access may also be used. Also, an external storage unit of another system connected to the network may be used as the external storage unit 17. Alternatively, an arbitrary combination of the above-described various storage media with the external storage unit 17 may be used as the external storage unit 17. Such media may be used in the case where the parameter estimation device 1 of FIG. 6 carries out batch processing, and images and observation values of the sensors may be stored onto these media.

Meanwhile, in the case where the target of parameter estimation such as multi-joint motion estimation is a human body, it is known, for example, that the elbow cannot be bent backward. Thus, each joint has a limit or a restraining condition. On the assumption that the degree of freedom of rotation of the shoulder in the horizontal direction is represented by $\Theta 1$, the degree of freedom of rotation of the shoulder in the vertical direction is represented by $\Theta 2$, the degree of freedom of rotation of the upper arm in the twisted direction is represented by $\Theta 3$, and the degree of freedom of rotation of the elbow is represented by $\Theta 4$, it can be considered that these parameters roughly have the following boundary conditions.

$$-45 \leq \Theta 1 \leq 130$$

$$-60 \leq \Theta 2 \leq 180$$

$$-90 \leq \Theta 3 \leq 90$$

$$0 \leq \Theta 4 \leq 150$$

In the parameter estimation such as multi-joint motion estimation of the present embodiment, estimation is carried out under such boundary conditions or constraints.

A parameter estimation device as a system of a first embodiment of the present invention will now be described.

A set of state variables (parameters) to be estimated are now expressed by a vector. A vector $x_k$ is a vector (n-dimensional) expressing the state variable of the k-th cycle. In the case where the state variable (parameter) estimation device 1 of FIG. 6 is applied to a multi-joint motion estimation device, the state vector $x_k$ of the k-th cycle of each joint as an estimation target is expressed, for example, by the following equation (17).

$$x_k = \begin{bmatrix} q_k \\ \dot{q}_k \\ \tau \end{bmatrix} \quad (17)$$

In this equation (17), $q_k$ represents the angle of the k-th cycle of each joint. The dot (.) of $q_k$ represents the angular velocity of the k-th cycle of each joint. $\tau_k$ represents the torque of the k-th cycle of each joint. If the degree of freedom of the multi-joint is n, the state vector $x_k$ is a 3n-dimensional vector.

Prediction is carried out similarly to the ordinary Kalman filter or EKF. Specifically, with respect to a linear system, the state variable is predicted in accordance with the equation (6) and the estimated error covariance is predicted in accordance with the equation (7). Hereinafter, a new update section in the embodiment of the present invention will be described.

Figure 7:
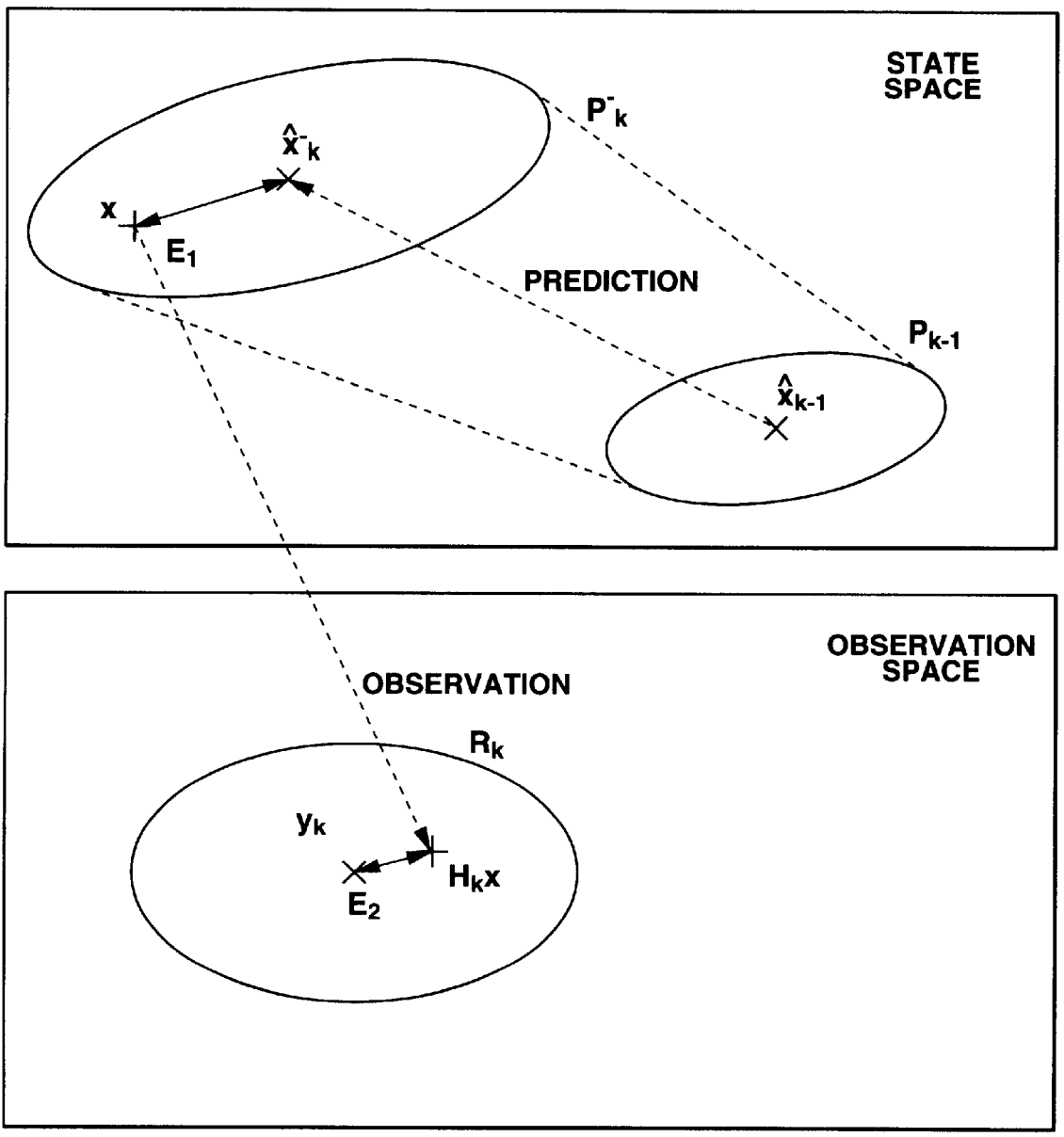
FIG. 7 illustrates the Mahalanobis distance in the state space and in the observation space.

A certain parameter x is considered. The distance corresponding to the distribution density, that is, the Mahalanobis distance, between the predicted state variable (expressed by the formula (3)) and the parameter x in the normal distribution having the estimated error covariance (expressed by the formula (5)) predicted in the state space shown in FIG. 7, is represented by $E_1$. The Mahalanobis distance between a variable $H_k x$ (in the case of the nonlinear system, $h_k(x)$) and an observation value $y_k$ in projecting the parameter x into the observation space in the normal distribution having the observed error covariance $R_k$ is represented by $E_2$.

This Mahalanobis distance is defined by the following equation (18) when it is in conformity with the normal distribution where the vectors x and y have the same covariance matrix R. If the distribution has no unevenness, that is, if R is a unit matrix, the Mahalanobis distance coincides with the Euclid distance.

$$d_M(x, y) = [(x-y)^T R^{-1}(x-y)]_{1/2} \quad (18)$$

It can be mathematically proven that the value x at the time when the sum of the square of the Mahalanobis distance $E_1$ and the square of the Mahalanobis distance $E_2$ is minimized is equivalent to the estimation value of the Kalman filter. In the present embodiment, a solution is to be found with respect to the case where the state variable has a boundary condition or a restraining condition. Therefore, under the restraining condition $g(x) \leq 0$ expressed by the inequality like the following formula (19) and the constraint $r(x) \leq 0$ expressed by an equation, the value x at the time when the sum of the square of $E_1$ and the square of $E_2$ is minimized is found and regarded as the estimation value of the filter of the present invention. If the restraining condition is only the above-described boundary condition, it is expressed by $g(x) \leq 0$ and the condition of $r(x)=0$ need not be designated. In place of the square sum of the respective Mahalanobis distances $E_1$ and $E_2$, the absolute value sum may be used.

$$\begin{cases} \arg \min_x (x - \hat{x}_k^-)^T P_k^{-1}(x - \hat{x}_k^-) + (y_k - h(x))^T R_k^{-1}(y_k - h(x)) \\ g(x) \leq 0 \\ r(x) = 0 \end{cases} \quad (19)$$

The operation of the parameter estimation device 1 of FIG. 6 used for multi-joint motion estimation or the like will now be described with reference to the flowchart of FIG. 8 and the data-flow diagram of FIG. 9. The data-flow diagram is a broadly known notation in the object-oriented analysis. It shows the functional relation between the values calculated in the system, including input values, output values and internal data storage. The data-flow diagram is a graph showing the flow of data, which flows from a data source inside an object, then goes through a process for converting data and reaches a target inside another object. The data-flow diagram is constituted by processes for converting data (shown as ellipses), data flows for carrying data (shown as arrows), actor objects representing production and consumption of data (shown as rectangles), and data storage objects for passively storing data (shown as being held between two bold straight lines). The external storage unit 17 of FIG. 6 can be used, for example, as a storage sd for the state vector and a storage eec for the estimated error covariance in the data-flow diagram of FIG. 9. As the data storage object, the data is stored into the data memory 13 in a short term, and if the data is image data, it is stored into the frame memory 14.

Figure 10:
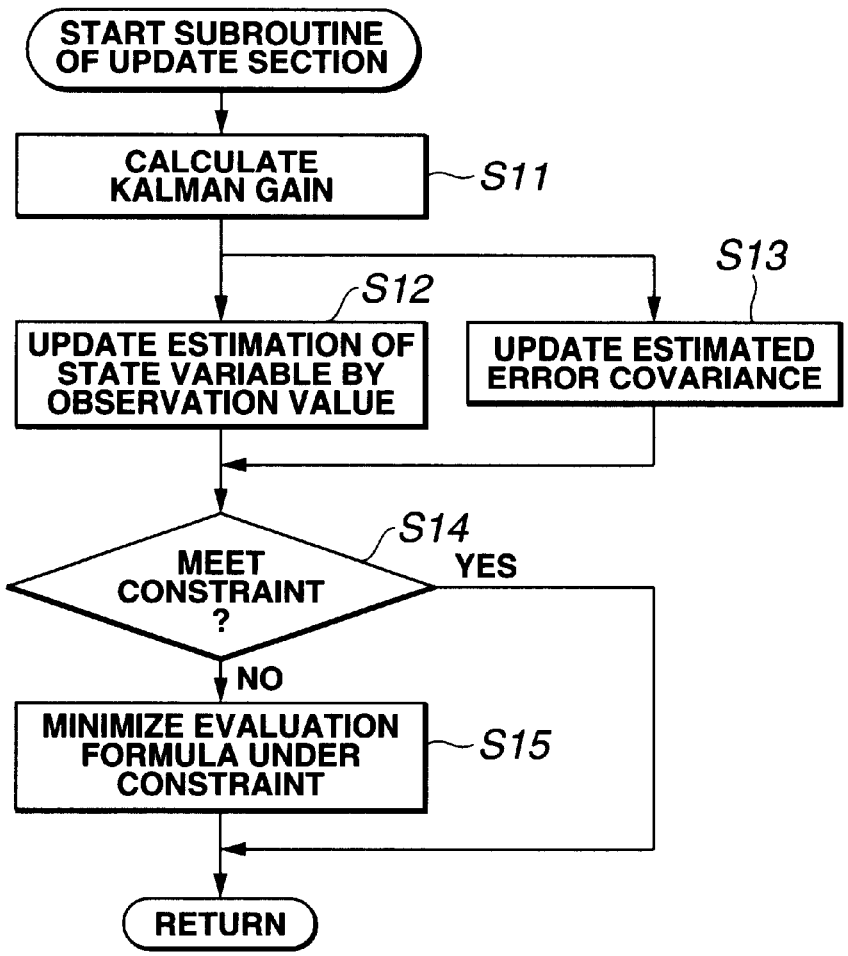
FIG. 10 is a flowchart for explaining the subroutine of an update section of the embodiment of the present invention.

The details of an update subroutine (step S5 of FIG. 8) as an essential portion of the embodiment of the present invention are shown in the flowchart of FIG. 10.

Figure 8:
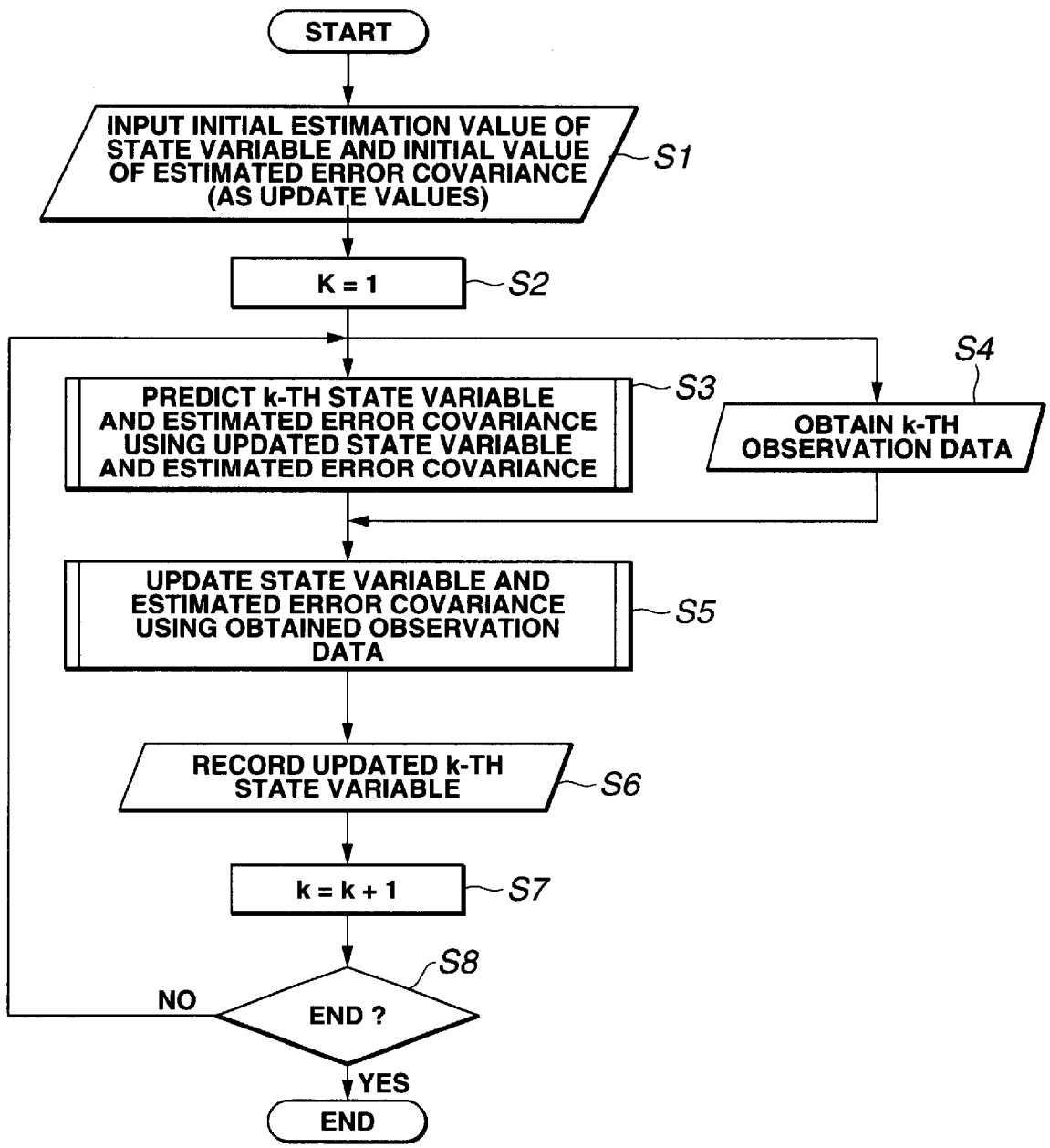
FIG. 8 is a flowchart for explaining the processing procedure of parameter estimation as the embodiment of the present invention.

First, at step S1 of FIG. 8, an initial estimation value $x_0(\hat{})$ of the state vector $x_k$ expressed by the equation (17) and an initial estimated error covariance value $P_0$ of the estimated error covariance $P_k$ are provided. These values can be directly inputted from the input unit 16 of FIG. 6 by the user, but these initial values (initial estimation value $x_0(\hat{})$ and initial estimated error covariance value $P_0$) may also be provided from other sensor information. Alternatively, for example, in the case of inputting other image data, the user may provide the initial values by interactively fitting a 3-D model using the keyboard or mouse of the input unit 16 while watching the image of the first frame. Moreover, an output from another motion parameter estimation device may also be used as the initial value.

At the next step S2, the CPU 11 changes the initial estimation value $x_0(\hat{})$ of the state vector $x_k$ and the initial estimated error covariance value $P_0$ of the estimated error covariance $P_k$, stored in the data memory 13, to data of k=1, that is, data of the first cycle. The data is used as internal information of the first cycle.

At step S3, the CPU 11 calculates and predicts the state vector $x_{(k+1)}(\hat{})$ and the estimated error covariance $P_{(k+1)}$ of the (k+1)th cycle, using the updated state vector $X_k(\hat{})$ and estimated error covariance $P_k$ of the k-th cycle. A specific example of this prediction processing will be later described in detail with reference to the flowchart of FIG. 13.

At step S4, in parallel to step S3, the CPU 11 obtains the observation data of the k-th cycle from the data stored in the data memory 13. This observation data may be a sensor signal. In such case, an interface for the sensor signal is provided in the input unit 16 of FIG. 6. Alternatively, by performing tracking (feature point tracking or area tracking) or segmentation (area division) on images of respective frames of an image sequence, position information and posture information of each joint and information of the combination thereof may be obtained and used as observation data. In such case, an interface with a device for carrying out tracking or segmentation is provided in the input unit 16. In the case of constructing a system for obtaining information from an image as described above on the same hardware, an interface with a video equipment such as a camera or a video deck is provided as the input unit 16, and the above-described system may share the elements of the multi-joint motion estimation device 1. The processing of step S4 corresponds to the input from INPUT in the data-flow diagram of FIG. 9, which means that an external system provides data to the present system.

The next step S5 is an update subroutine, where the CPU 11 updates the data stored in the data memory 13. The details of the update processing are shown in the flowchart of FIG. 10. In the data-flow diagram of FIG. 9, two processes of ud (first update) and opt (second update) are employed. Hereinafter, the update subroutine of step S5 will be described with reference to FIG. 10.

At step S11 of FIG. 10, the CPU 11 calculates the Kalman gain $K_k$ from the obtained observation data $y_k$ of the k-th cycle. In this case, since the target of the present system is a nonlinear system, the CPU 11 calculates an observation matrix $H_k$ on the basis of the following equation (20) (which is the same as the equation (16)).

$$H_{k(i,j)} = \frac{\partial h_{(i)}(\hat{x}_k)}{\partial x_{k(j)}} \quad (20)$$

In this equation, as described above, $H_{k(i,j)}$ represents the matrix elements of the i-th row and the j-th column of the observation matrix $H_k$, and is calculated by partially differentiating the i-component of the function h with the j-component of the state variable $x_k$.

Then, the CPU 11 calculates the Kalman gain $K_k$ of the k-th cycle on the basis of the following equation (21) (which is the same as the equation (8)).

$$K_k = P^-_k H_k^T (H_k P^-_k H_k^T + R_k)^{-1} \quad (21)$$

In this equation, $P^-_k$ represents the estimated error covariance value before update, $P_k$ represents the estimated error covariance after update, and $H_k^T$ represents the transported matrix of $H_k$.

At step S12, the CPU 11 updates estimation of the state vector x by using the observation data $y_k$. Specifically, since the system is a nonlinear system, the CPU 11 updates the state vector on the basis of the following equation (22) (which is the same as the equation (14)), using the observation data $y_k$.

$$\hat{x}_k = \hat{x}_k^- + K_k(y_k - h(\hat{x}_k^-)) \quad (22)$$

In this equation, as described above, $x^-_k(\hat{})$ represents the estimated state vector before update and $x_k(\hat{})$ represents the estimated state vector after update.

At step S13, the CPU 11 updates the estimated error covariance $P_k$ on the basis of the following equation (23) (which is the same as the equation (10)).

$$P_k = (I - K_k H_k) P^-_k \quad (23)$$

In this equation, I represents a unit matrix having the same order as $P_k$.

Although the processing of steps S12 and S13 can be carried out in parallel, sequential calculation from step S12 to step S13 or from step S13 to step S12 may also be carried out.

Figure 9:
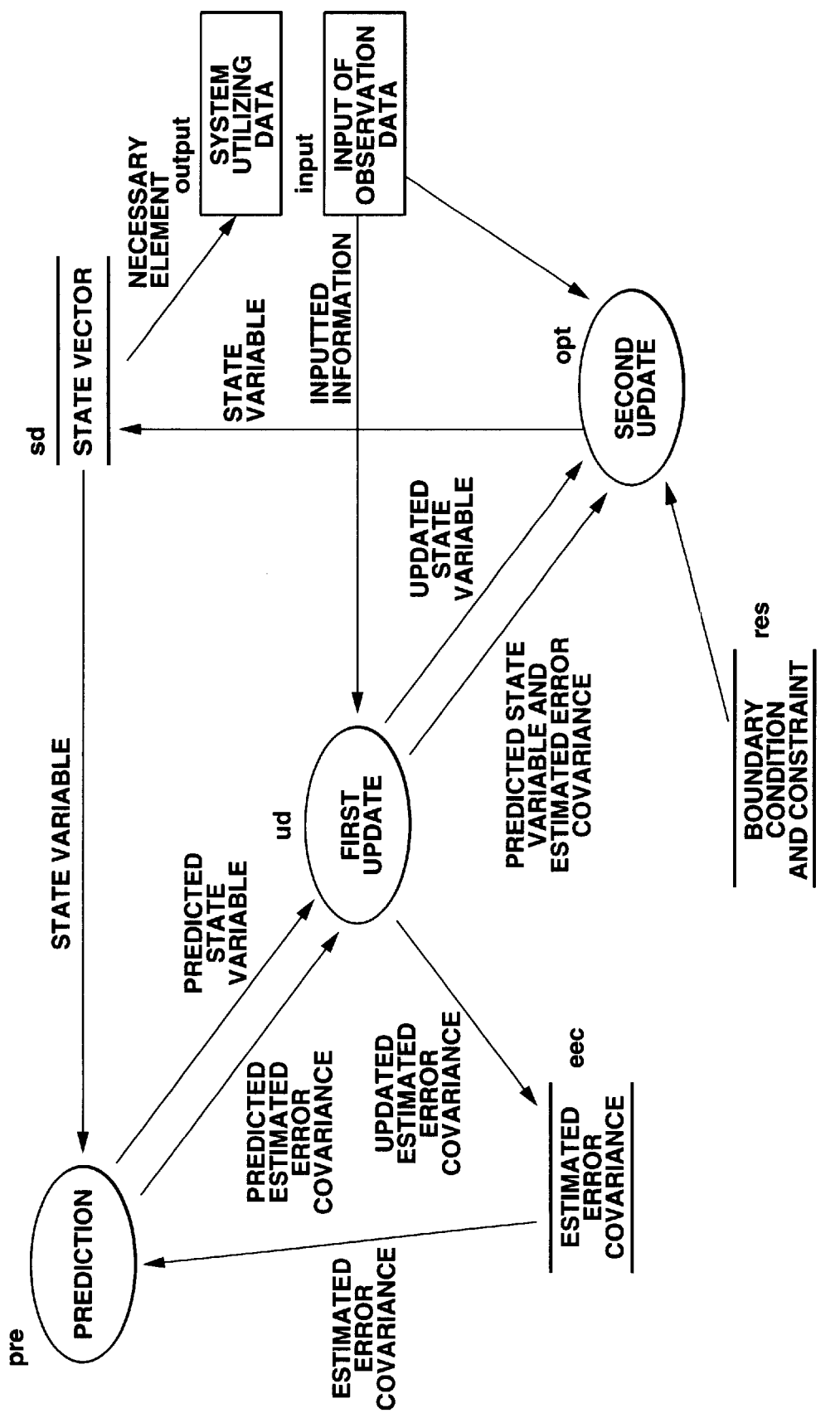
FIG. 9 shows the data flow for explaining the operation of the embodiment of the present invention.

These steps S11 to S13 are similar to the conventional technique and are equivalent to the description of the first update process ud in the data-flow diagram of FIG. 9. In the embodiment of the present invention, the second update process opt is additionally provided, which will be described hereinafter.

At step S14, it is checked whether the state variable updated in the first update process ud meets the constraint or not. Specifically, if the estimation value $x(\hat{})$ updated in the first update process ud is expressed by x, it is checked whether or not the value x meets the boundary conditions or constraints $g(x) \leq 0$ and $r(x)=0$. In many cases, however, the condition $r(x)=0$ of the boundary conditions is omitted.

If the conditions are met, the estimation value (state variable and estimated error covariance) updated in the process ud is set as the update value and this subroutine ends. If the conditions are not met, the processing goes to step S15.

At step S15, minimization of the square sum of the Mahalanobis distance under the constraints is considered. Since the system is nonlinear, the formula (19) is solved. The absolute value sum of the Mahalanobis distance may also be used in place of the square sum of the Mahalanobis distance.

The target evaluation formula which finds and minimizes $H_k$ in accordance with the equation (20) can be approximately made the following formula (24).

$$(x-x_k^-)^T P^{-1}_k (x-x_k^-) + (y_k - H_k(x-x_k^-) - h(x_k^-))^T R_k^{-1} (y_k - H_k(x-x_k^-) - h(x_k^-)) \quad (24)$$

If there is no constraint in this case, the solution coincides with the value returned by the EKF (extension of the Kalman filter). However, since it is already known that the, value returned by the EKF does not meet the constraints at step S14, the optimum value must be found under such conditions. This can be found by using general quadratic programming expressed by the following formula (25).

$$\arg_x \min x^T C x + 2 c_0^T x$$

$$g(x) \leq 0$$

$$r(x) = 0 \quad (25)$$

Quadratic programming is described in various publications related to optimization and therefore will not be described further in detail. (References: Takashi Hurubayashi, "Linear Programming Guide", Sangyo Tosho; Katsuaki Ono, "Linear Programming Centering Around Calculation", Nichikagiren.) In this case, C in the formula (25) may be expressed by the following equation (26) and $c_0$ may be expressed by the following equation (27).

$$C = (P_k^-)^{-1} H_k^T R_k^{-1} + H_k$$

$$c_0 = -1/2\{(P_k^{-1} + P_k^{-1y})x_k^- + H_k^T(R_k^{-1} + R_k^{-1y})(y_k - h(x_k^-) - H_k x_k^-)\} \quad (27)$$

$$= -P_k^{-1} x_k^- + H_k^T R_k^{-1}(y_k - h(x_k^-) - H_k x_k^-)$$

In the case of finding the accuracy, it is possible to solve th formula (19) as it is by using nonlinear programming. As nonlinear programming, it is possible to use sequential quadratic programming (SQP) or to introduce an optimization algorithm based on a genetic algorithm.

With respect to the update of the state variable, the update value under the boundary conditions may be found by sending the prediction value and the observation value directly to the second update process opt, not via the first update process ud. However, the estimated error covariance must be updated on the basis of the equation (23) in the first update process ud.

In the case where the second update process opt is carried out after the first update value is found in the first update process ud as in the update subroutine shown in FIG. 10, the calculation for finding the second update value in the second update process opt is not necessary if the boundary conditions are met. Thus, the burden can be reduced.

Referring again to FIG. 8, at step S6 subsequent to the update subroutine of the above-described step S5, the CPU 11 causes the data memory 13 or the external storage unit 17 to store the updated state vector $x_k$ and estimated error covariance $P_k$ of the k-th cycle. In the data-flow diagram of FIG. 9, the state variable updated in the first update process ud and the second update process opt is stored in the data storage sd, and the estimated error covanance updated in the first update process ud is indicated by an arrow toward the data storage eec.

Figure 11:
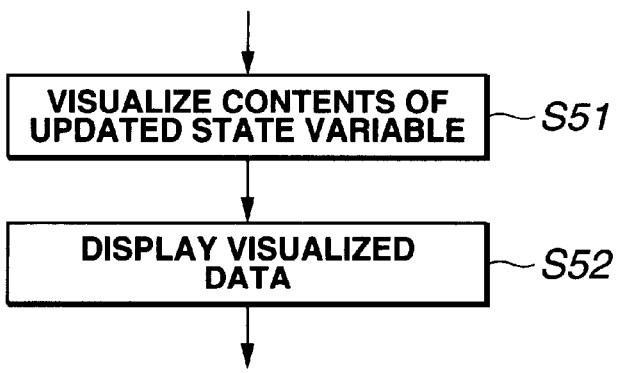
FIG. 11 shows processing steps inserted to the flowchart of FIG. 8, if necessary.

If there is no need to save the state in real-time processing, this step S6 is not necessary. In order to show the updated state variable to the user, a routine for visualizing the contents of the updated state variable at step S51 and displaying the visualized data at step S52 as shown in FIG. 11 may be inserted into the flowchart of FIG. 8. The visualized information obtained at step S51 of FIG. 11 is written into the frame memory 14 of FIG. 6 and outputted to the image display unit 15 at step S52.

At the next step S7, the CPU 11 makes an increment on the number of cycles in order to obtain data of the next cycle. That is, the CPU 11 changes the above-described number of cycles k to the number of cycles (k+1).

At step S8, the CPU 11 discriminates whether or not to continue the above-described estimation processing. If it is discriminated that the estimation processing is to be continued, the processing returns to step S3 and the processing of steps S3 to S8 is repeatedly carried out.

If it is discriminated that the estimation processing is not to be continued, the processing ends. The end of the processing may be discriminated, for example, by input from the user. If the data is image data, the end of the processing may be determined on the basis of the completion of processing of the last frame. Alternatively, the end of the processing may be determined in accordance with the restraints of hardware or software such as the memory being full.

In the above-described manner, in the case where the parameter estimation device 1 of FIG. 6 is applied to the multi-joint motion estimation device, the motion is predicted with the torque of each joint held as the state variable and on the assumption that the fluctuation of the torque is constant. Thus, the motion can be accurately predicted.

In the above-described embodiment, the angle, angular velocity and torque of each joint are used as elements. However, the length of each joint may also be used as an element. Thus, the motion estimation accuracy can be improved further.

In the above-described embodiment, the updated state vector x is recorded at step S6. However, step S6 may be omitted in the case where real-time processing need not be carried out. Also, steps S51 and S52 as shown in FIG. 11 may be inserted after step S5 or after step S6, so as to visualize the contents of the updated state vector x at step S51 for recording the visualized state vector x, and to display the visualized data on the image display unit 15 at step S52. Thus, the user can immediately confirm the prediction and update of the state vector on the image display unit 15.

A second embodiment of the information processing method and device according to the present invention will now be described with reference to the drawings.

In the second embodiment of the present invention, further functions are added to the embodiment described with reference to FIGS. 8 to 11. The second embodiment is adapted for estimating the motion information of a multi-joint object having restraining conditions by using an estimation method which holds the torque information of the multi-joint object and which assumes that the fluctuation of the torque information has normal distribution. This second embodiment includes a step of holding the torque information of the multi-joint object and a step of calculating the angular velocity from other motion information and the torque information.

In the recursive estimation filter having the boundary conditions, more precise estimation can be carried out by approximating the prediction model (process model) to the actual physical behavior.

Specifically, in the present embodiment, the torque of each joint is held as a state variable and the torque is assumed to be constant. For example, the angle, angular velocity and torque of each joint are provided as elements of the state variable that should be constantly held inside and is employed as the estimation target. It is expressed by a vector and mathematically expressed by the equation (17). The combination of elements of the state vector described in the present embodiment is simply an example. For example, it is also possible to employ the length between joints as an element, then estimate it, and thus improve the measuring accuracy.

Figure 12:
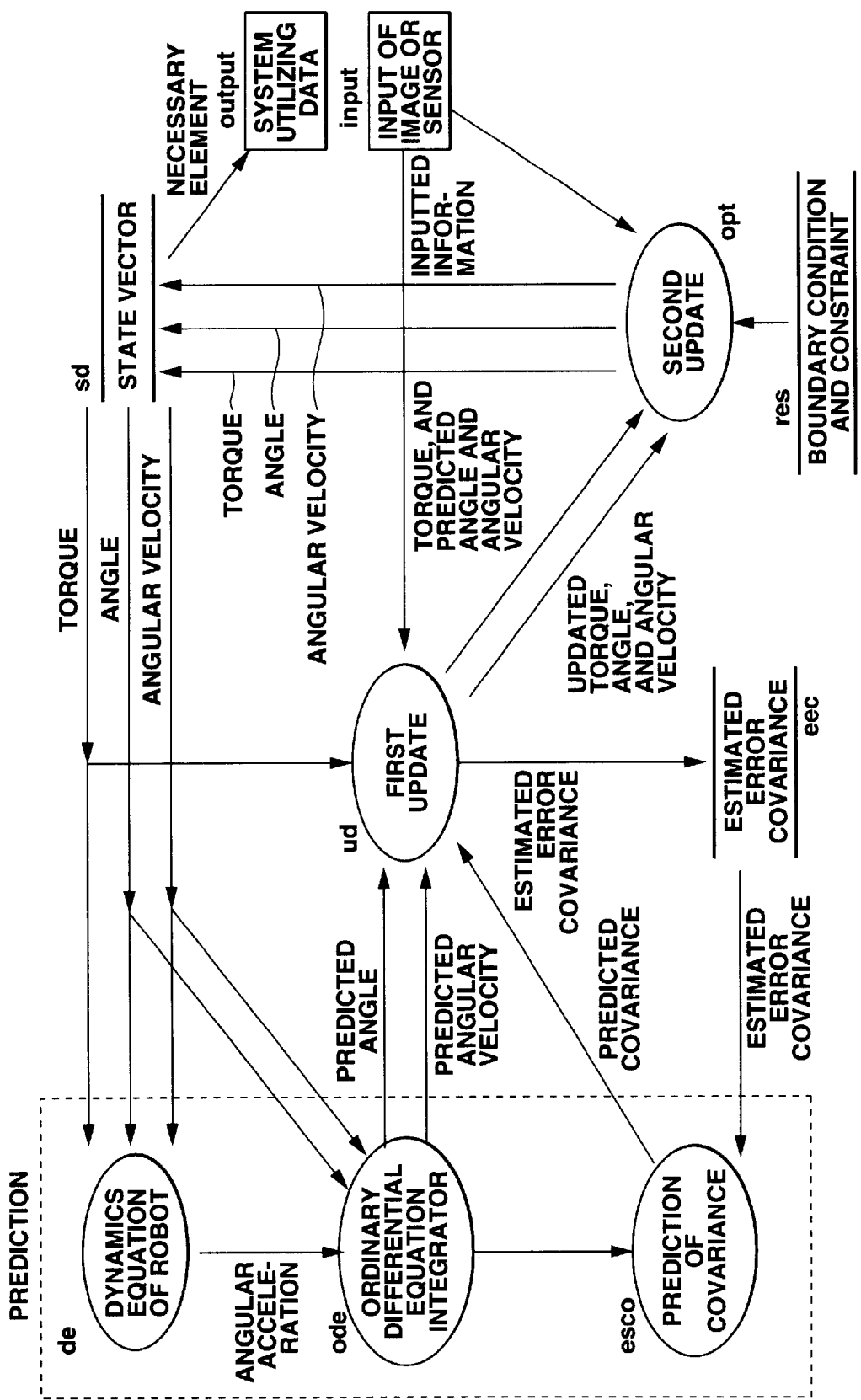
FIG. 12 shows the data flow for explaining the operation of a second embodiment of the present invention.
Figure 13:
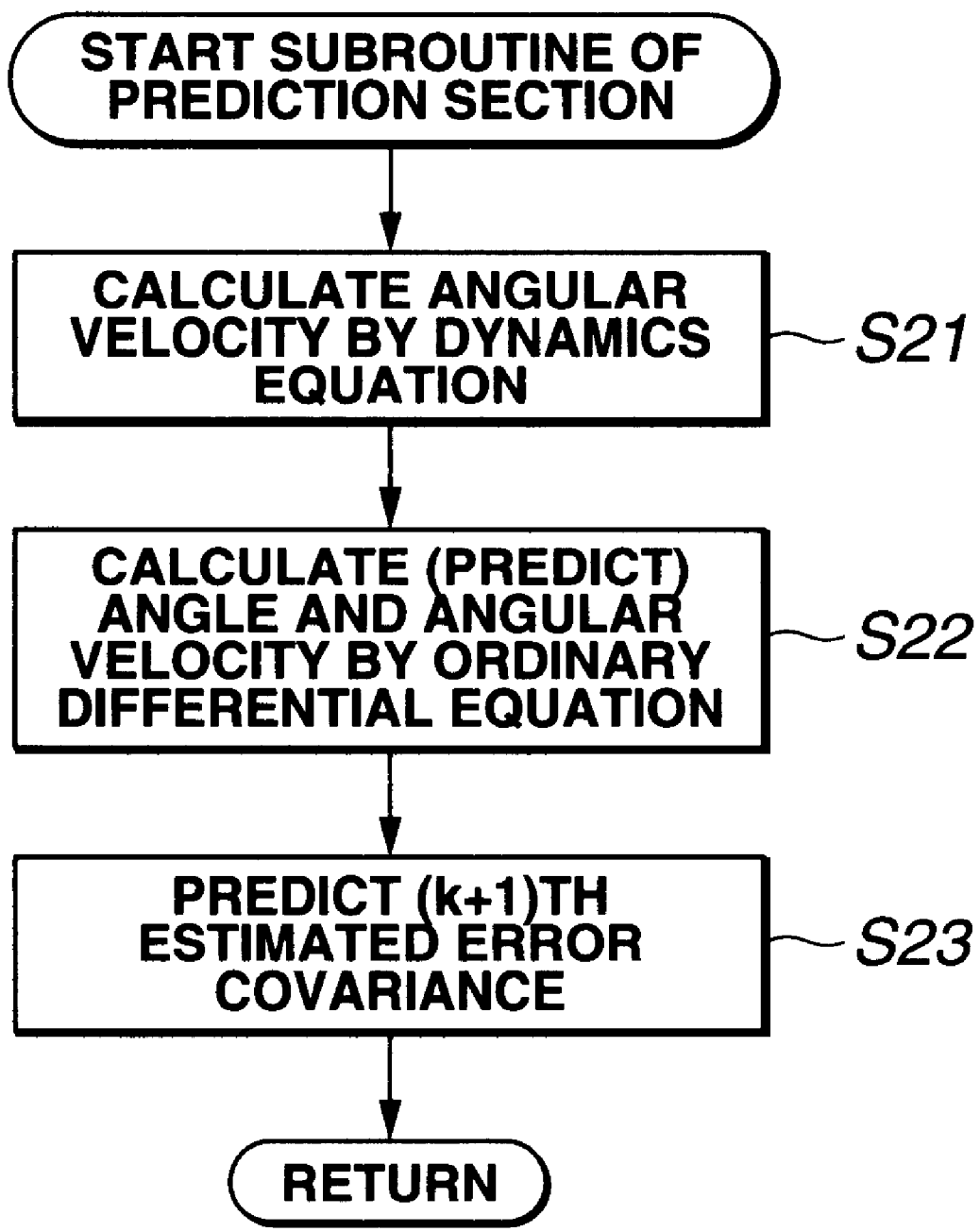
FIG. 13 is a flowchart for explaining the subroutine of a prediction section in parameter estimation as the second embodiment of the present invention.

FIG. 12 shows the data-flow diagram of the second embodiment of the present invention. The main part of the operation is similar to the flowchart of FIG. 8, but the prediction subroutine of step S3 is largely different. The details of the prediction subroutine are shown in FIG. 13.

With the dynamics equation, which is often used in finding the relation of the angle, acceleration and torque as in robotics or the like, the relation of the torque with respect to each joint of a multi-joint object and the angle, angular velocity and angular acceleration of each joint is found in accordance with the following equation (28).

$$\tau = M(q)q.. + b(q,q.) \tag{28}$$

In this equation (28), the matrix M(q) is referred to as the mass matrix, which is the function of the angle q of each joint. b(q,q.) represents the sum of the centrifugal force, Coriolis force, gravity, viscosity and elasticity. It is guaranteed that the inverse matrix is necessarily found for M(q). This is described in John J. Craig, "Introduction to Robotics—Mechanics and Control", Second Edition, Addison-Wesley Publishing Co., 1989. Thus, the angular acceleration can be calculated from the torque, angle and angular velocity in accordance with the following equation (29).

$$q.. = \{M(q)\}^{-1}\{\tau - b(q,q.)\} \tag{29}$$

Specifically, at step S21 of the flowchart of FIG. 13, the CPU 11 of FIG. 6 calculates the angular acceleration $q_k(..)$ of the k-th cycle from the state vector $x_k$ stored in the data memory 13. In this processing, the angular acceleration $q_k(..)$ is calculated by substituting the angle $q_k$, the angular velocity $q_k(.)$ and the torque $\tau_k$ in accordance with the equation (29) modified from the dynamics equation (28).

The processing of step S21 is represented by the arrows indicating the state vectors of the angle, angular velocity and torque stored in the data storage sd toward the angular acceleration calculation process de of the prediction block, the angular acceleration calculation processing in the angular acceleration calculation process de, and the arrow indicating the angular acceleration calculated in the angular acceleration calculation process de toward the angle and angular velocity prediction process ode, in the data-flow diagram of FIG. 12.

At the next step S22, the CPU 11 calculates the angle $q_{k+1}$ and the angular velocity $q_{k+1}(.)$ of the next cycle (k+1) on the basis of the state vector $x_k$ stored in the data memory 13 and the angular acceleration $q_k(..)$ calculated at step S21. The following ordinary differential equation (30) is an equation for calculating the vector $z_{k+1}$ of the next cycle (k+1) from a certain vector $z_k$ and the differentiation $z_k(.)$ of the vector.

$$Z_{k+1} = \text{ODEINT}(z_k, z_{\cdot k}) \quad (30)$$

In this equation (30), ODEINT is an ordinary differentiation equation integrator (solver) represented, for example, by the Runge-Kutta method. The CPU 11 calculates the angle $q_{k+1}$ and the angular velocity $q_{k+1}(.)$ of the next cycle (k+1) on the basis of the following equation (31) using ODEINT of the equation (30) and the angular acceleration $q(..)$ calculated by the equation (29).

$$\begin{pmatrix} q_{k+1} \\ q_k^* \end{pmatrix} = \text{ODEINT}(\ ,\ ) \begin{pmatrix} q_k \\ q_k^* \end{pmatrix} \begin{pmatrix} q_k^* \\ q_k^{**} \end{pmatrix} \quad (31)$$

In this case, it is known from the equation (31) that the value of the angular acceleration of the current cycle is necessary. In accordance with the equation (29), the angular acceleration can be found by using the information included in the state variable. That is, it is understood that the state vector $z_{k+1}$ of the next cycle (k+1) can be precisely calculated from the state variable (state vector $x_k$) of the current cycle in accordance with the foregoing equations. The processing of step S22 is represented by the arrows indicating the angle and angular velocity stored in the state storage sd toward the angle and angular velocity prediction process ode, the angle and angular velocity prediction processing in the angle and angular velocity prediction process ode, and the arrows indicating the predicted angle and predicted angular velocity calculated in the angle and angular velocity prediction process ode toward the first update process ud, in the data-flow diagram of FIG. 12.

The processing of the prediction process is expressed by the following equation (32).

$$\begin{pmatrix} q_{k+1} \\ q_k^* \\ \tau_{k+1} \end{pmatrix} \text{ODEINT}(\ ,\ ) + \begin{pmatrix} q_k \\ q_k^{*=} \\ \tau_k \end{pmatrix} \begin{pmatrix} q_k^* & \varepsilon_1 \\ q_k^{**} & \cdots & \varepsilon_2 \\ & & \omega \end{pmatrix} \quad (32)$$

This equation (32) will now be explained. In the example where the parameter estimation device of FIG. 6 is applied to a multi-joint motion estimation device, the fluctuation of the torque is assumed to be constant and is regarded as the Gaussian noise, represented by $\omega$. In the case of calculating the angle and angular velocity of the next cycle, though quite precise calculation can be carried out by the above-described method, a noise vector $\epsilon_1$ and a noise vector $\epsilon_2$ expressing an error are defined in order to eliminated the error associated with calculation of numeric values. The noise vector $\epsilon_1$ and the noise vector $\epsilon_2$ have small values and are sufficiently smaller than the Gaussian noise $\omega$, meeting the condition of $\epsilon_1, \epsilon_2 \ll \omega$. However, in a processing system where the accuracy of numeric calculation is not high, it is possible to have large values as $\epsilon_1$ and $\epsilon_2$. Also, in the case where an ordinary differential equation integrator (solver) having low accuracy as in the Euler method is used for the purpose of reducing the calculation time, large values may be employed as $\epsilon_1$ and $\epsilon_2$.

The processing of step S21 and the processing of step S22, that is, the equation (29) and the equation (32), can be collectively expressed by the following equation (33).

$$\begin{pmatrix} q_{k+1} \\ q_{k+1}^* \\ \tau_{k+1} \end{pmatrix} = \text{ODEINT}\begin{pmatrix} q_k q_k^* \\ q_k^*, \{M(q_k)\}^{-1}\{\tau_k - b(q_k, q_k^*)\} \\ \tau_k \end{pmatrix} + \begin{pmatrix} \varepsilon_1 \\ \varepsilon_2 \\ \omega \end{pmatrix}.$$

At step S23, the CPU 11 calculates estimated error covariance $P_{k+1}$ of the next cycle (k+1) from the estimated error covariance $P_k$ stored in the data memory 13. First, the CPU 11 calculates the state transition matrix $A_k$ in accordance with the equation (15) using the angle $q_{k+1}$ and the angular acceleration $q_{..k}$ of the next cycle (k+1) calculated at step S22.

As described above, $A_{k(i,j)}$ represents the matrix elements of the i-th row and the j-th column of the state transition matrix $A_k$. f(j) represents the j-component of the function f. $A_{k(i,j)}$ can be calculated by partially differentiating f(j) with the j-component of the state variable $x_k$.

Then, the CPU 11 calculates estimated error covariance $P_{k+1}^-$ of the next cycle (k+1) from the calculated state transition matrix $A_k$ and the estimated error covariance $P_k$ stored in the data memory 13 in accordance with the equation (7). This processing is equivalent to the covariance prediction process esco in the data-flow diagram of FIG. 12.

The foregoing processing is the prediction subroutine of FIG. 13, which is the main part of the second embodiment. The other parts of the structure and operation are similar to those of the embodiment described with reference to FIGS. 8 to 11 and therefore will not be described further in detail.

Figure 14:
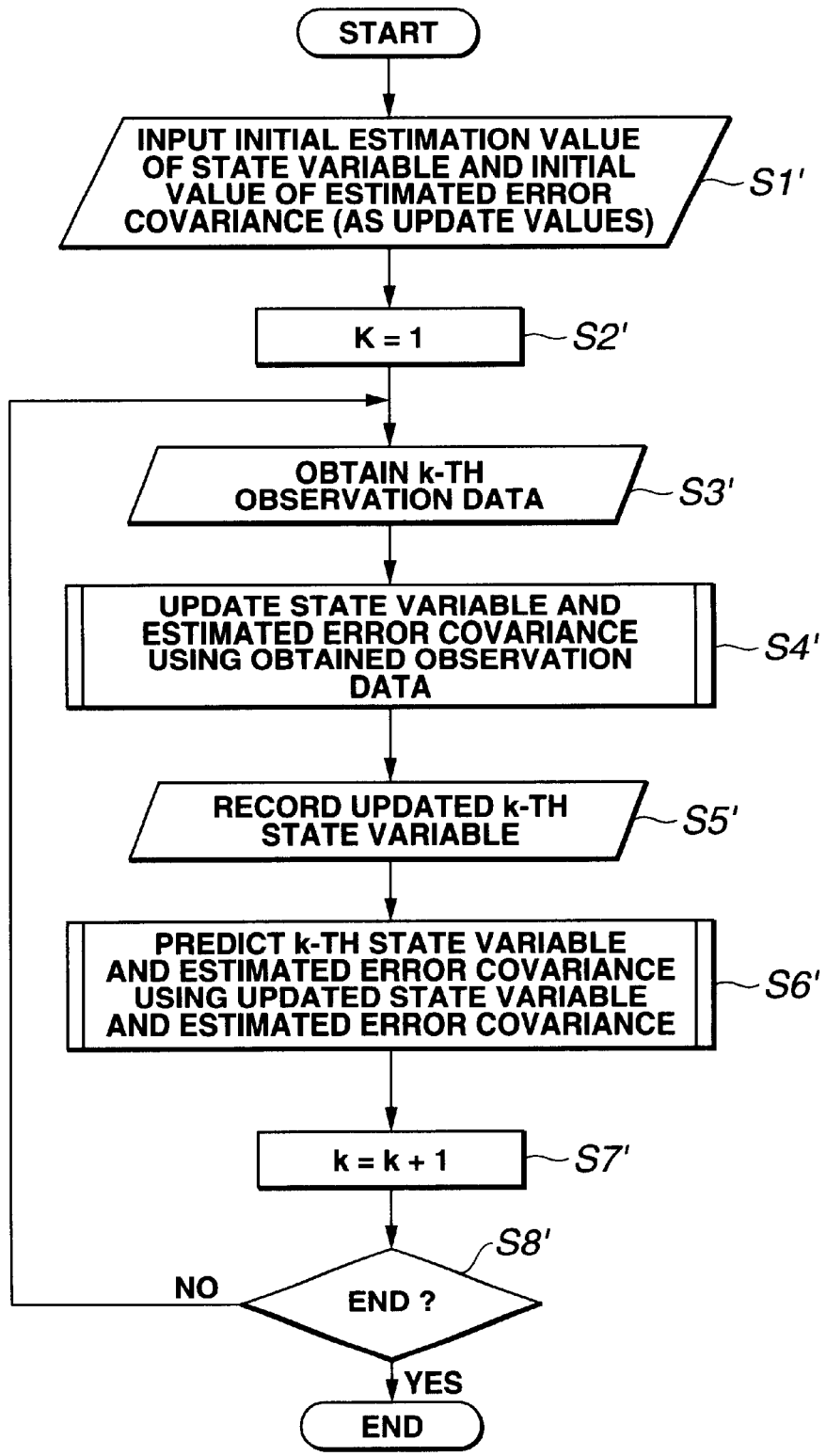
FIG. 14 is a flowchart for explaining the processing procedure of a modification of parameter estimation as the embodiment of the present invention.

FIG. 14 shows a modification of the flowchart of FIG. 8. In FIG. 14, an initial estimation value of the state variable and an initial value of the estimated error covariance are inputted as prediction values at step S1', and k=1 is set at step S2'. Then, at step S3', the k-th observation data is obtained. At step S4', the state variable and the estimated error covariance are updated by using the obtained observation data. At step S5', the updated k-th state variable is recorded. At step S6', the (k+1)th state variable and estimated error covariance are predicted by using the updated state variable and estimated error covariance. Then, k=k+1 is set at step S7' and whether the processing should end or not is discriminated at step S8'. If the processing should not end, the processing returns to step S3'. Parameter estimation is also possible in accordance with such procedures.

In the above description, estimation is carried out on the assumption that the observation data has already been obtained. However, the parameter estimation device 1 for multi-joint motion estimation or the like shown in FIG. 6 may also be used for generation of the observation data. The concept of such case is shown in FIG. 15.

Figure 15:
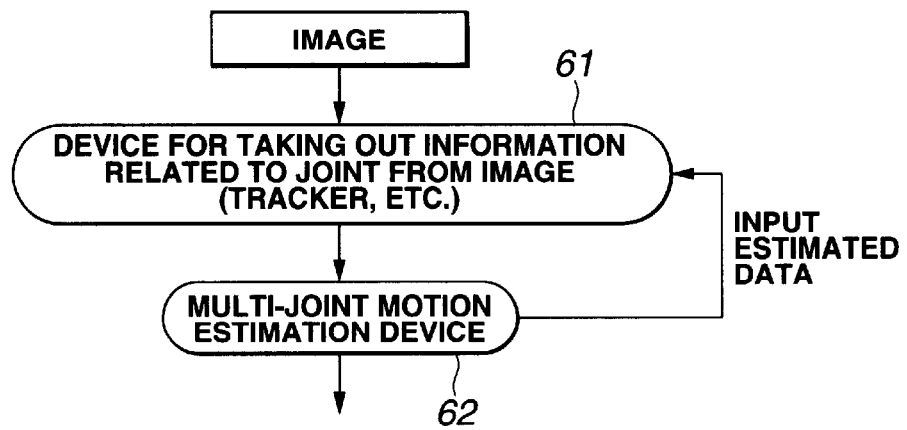
FIG. 15 is a conceptual view showing an application in which the embodiment of the present invention is applied to a multi-joint motion estimation device.

As shown in FIG. 15, information related to the joint is taken out from an inputted image by a device 61 such as a tracker for taking out the information related to the joint, and an estimation value is predicted by a multi joint motion estimation device 62 to which the parameter estimation device 1 of FIG. 6 is applied. From the predicted estimation value, feedback is carried out to the device 61 for taking out the information related to the joint. Thus, the observation accuracy van be improved.

A third embodiment of the information processing method and device according to the present invention will now be described with reference to the drawings.

In a system of the third embodiment of the present invention, estimation of the state variable (parameter) is carried out using a smoother. Specifically, a fixed-lag smoother is considered. The algorithm of the fixed-lag smoother, which will be later described in detail, is now roughly explained as follows. If the length of the lag is expressed by L, filtering (forward update) is repeatedly carried out up to L steps forward from the state variable at a predetermined position to be estimated on the time base, and at the time point when an observation value of L steps forward is obtained, the state variable at the predetermined position is estimated (backwardly estimated).

As the smoother of the third embodiment, the structure of FIG. 6 can be employed. It is assumed that the smoother having the structure shown in FIG. 6 is applied particularly to a multi-joint motion estimation device.

In the case where the smoother is used, a set of state variables (smoother) to be estimated is expressed by a vector similarly to the foregoing first and second embodiments. The vector $x_k$ is a vector (n-dimensional) expressing the state variable of the k-th cycle. In the case where the smoother having the structure of FIG. 6 is applied to, for example, a multi-joint motion estimation device, the state vector $x_k$ of the k-th cycle of each joint as an estimation target is expressed by the equation (17).

In the above-mentioned filtering, which is forward update, the prediction value of the state variable at that time point is found on the basis of the update value of the state variable immediately before, and the state variable is updated on the basis of the obtained prediction value and the observation value at that time point.

Prediction is carried out similarly to the ordinary Kalman filer or EKF. That is, with respect to a linear system, the state variable is predicted in accordance with the equation (6) and the estimated error covariance is predicted in accordance with the equation (7).

The case of updating the state-variable under boundary conditions in the update section of the Kalman filter is as described above and therefore will not be described further in detail. In the present embodiment, a solution is to be found with respect to the case where the state variable has a boundary condition or a restraining condition. Therefore, under the restraining condition $g(x) \leq 0$ expressed by the inequality of the formula (19) and the constraint $r(x)=0$ expressed by an equation, the value x at the time when the sum of the square of $E_1$ and the square of $E_2$ is minimized is found and regarded as the update value or estimation value of the filter of the present invention.

After the filtering processing of forward update is repeated, backward estimation is carried out and one round of smoothing processing ends.

The operation of the smoother shown in FIG. 6 used for multi-joint motion estimation or the like will now be described with reference to the flowchart of FIG. 16 and the data-flow diagram of FIG. 17. The data-flow diagram is a broadly known notation in the object-oriented analysis. It shows the functional relation between the values calculated in the system, including input values, output values and internal data storage. The data-flow diagram is a graph showing the flow of data, which flows from a data source inside an object, then goes through a process for converting data and reaches a target inside another object. The data-flow diagram is constituted by processes for converting data (shown as ellipses), data flows for carrying data (shown as arrows), actor objects representing production and consumption of data (shown as rectangles), and data storage objects for passively storing data (shown as being held between two bold straight lines). The external storage unit 17 of FIG. 6 can be used, for example, as a storage sd for the state vector and a storage eec for the estimated error covariance in the data-flow diagram of FIG. 17. As the data storage object, the data is stored into the data memory 13 in a short term, and if the data is image data, it is stored into the frame memory 14.

Figure 16:
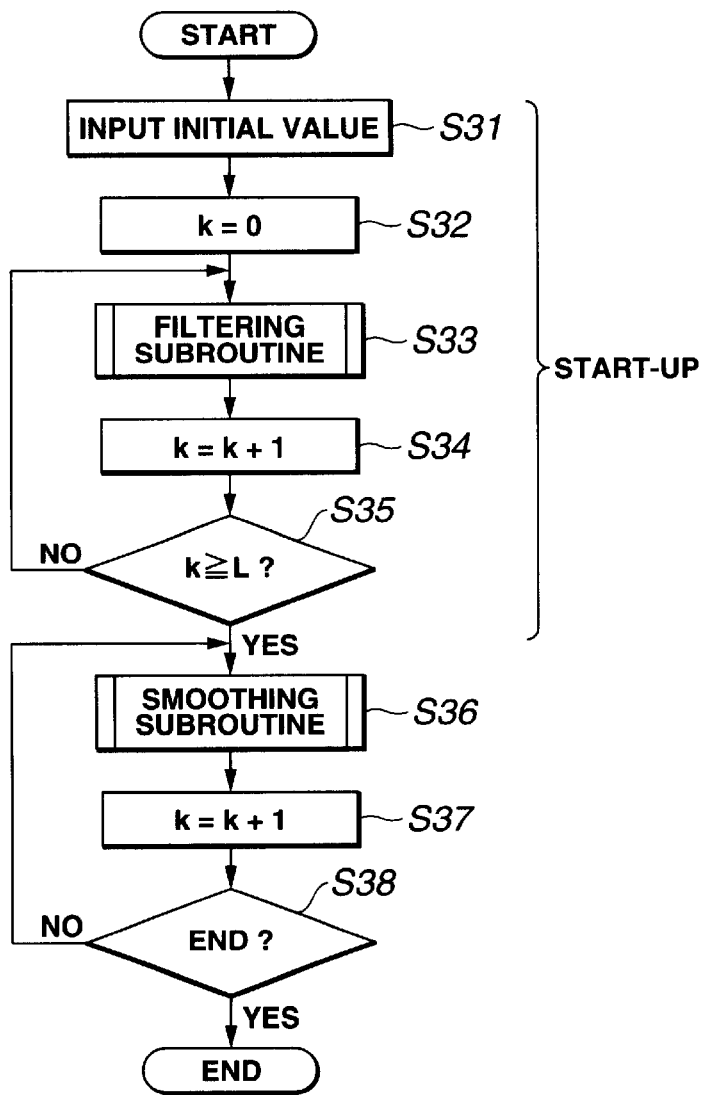
FIG. 16 is a flowchart for explaining the operation of a smoother for parameter estimation as a third embodiment of the present invention.
Figure 17:
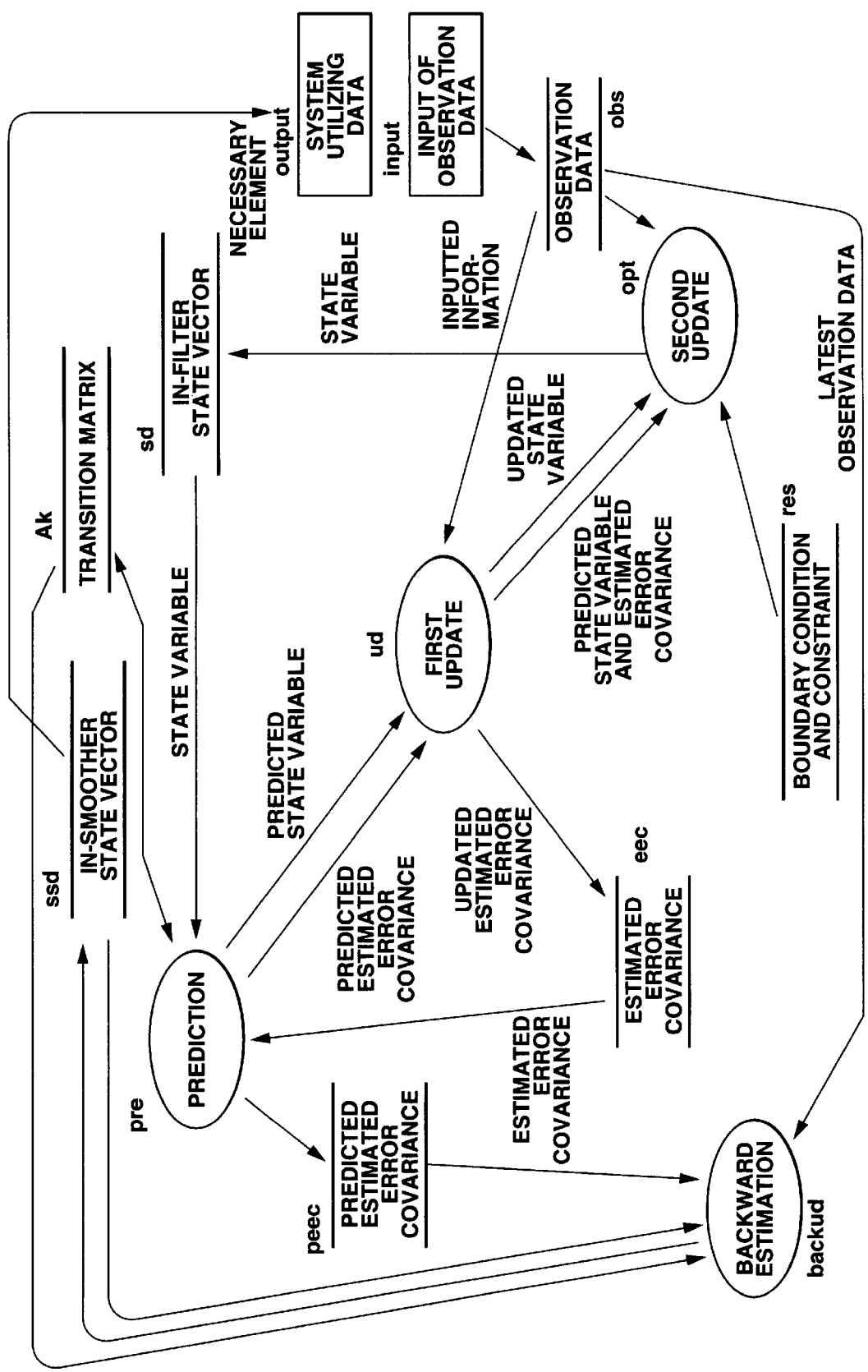
FIG. 17 shows the data flow for explaining the operation of the embodiment of the present invention.
Figure 19:
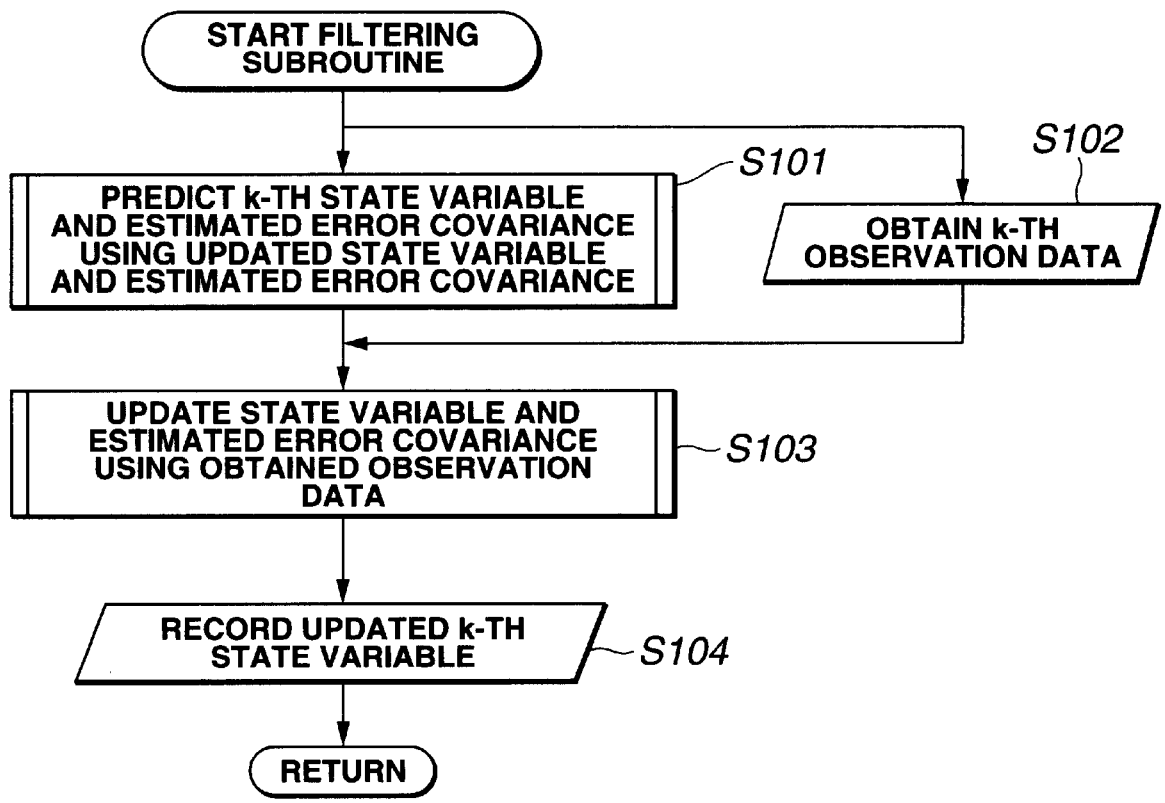
FIG. 19 is a flowchart for explaining the subroutine of filtering according to the embodiment of the present invention.
Figure 20:
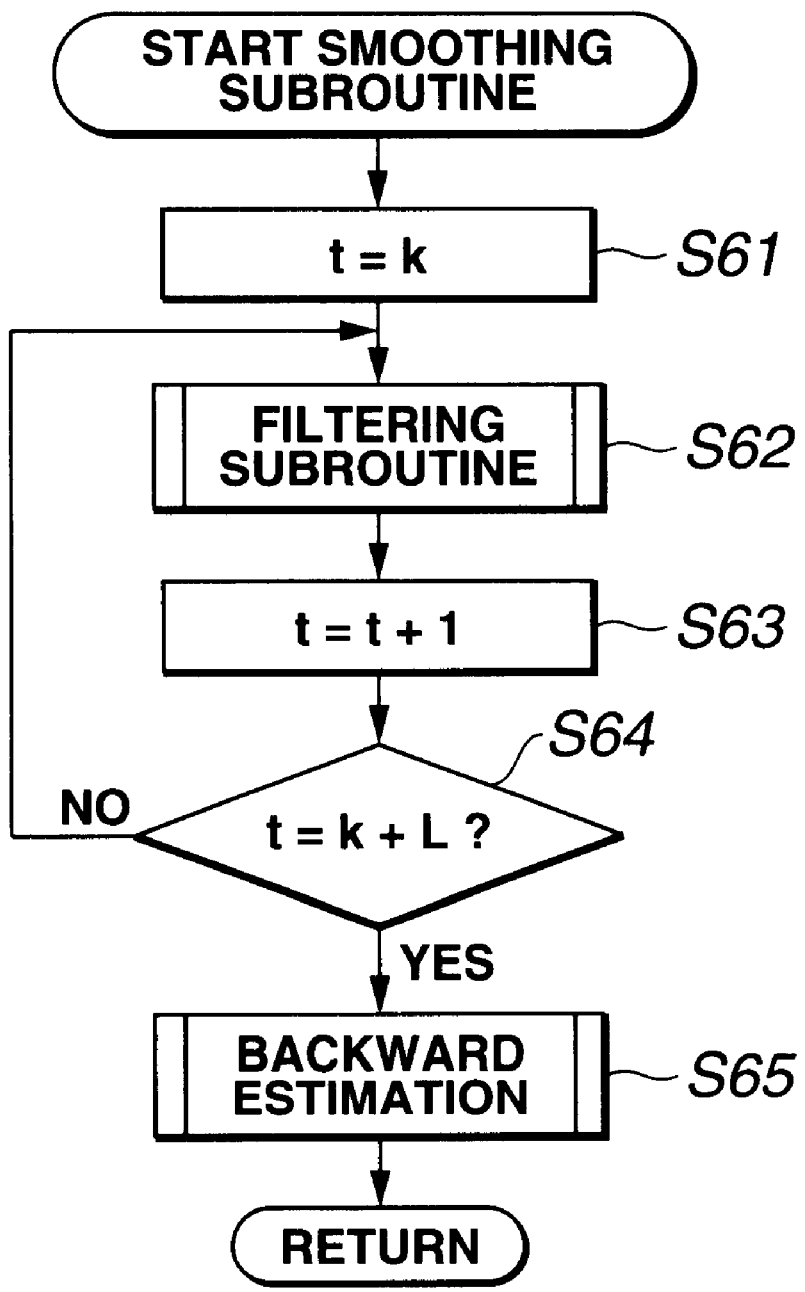
FIG. 20 is a flowchart for explaining the subroutine of smoothing according to the embodiment of the present invention.

The filtering subroutine of step S33 in the flowchart of FIG. 16 is shown in FIG. 19, which will be described later. The smoothing subroutine is shown in FIG. 20, which will also be described later.

First, at step S31 in the flowchart of FIG. 16, initial values are inputted. Specifically, an initial estimation value $x_0(\hat{})$ of the state vector $x_k$ expressed by the equation (34) (which is the same as the equation (17)) and an initial estimated error covariance value $P_0$ of the estimated error covariance $P_k$ are provided. These values can be directly inputted from the input unit 16 of FIG. 6 by the user, but these initial values (initial estimation value $x_0(\hat{})$ and initial estimated error covariance value $P_0$) may also be provided from other sensor information. Alternatively, for example, in the case of inputting other image data, the user may provide the initial values by interactively fitting a 3-D model using the keyboard or mouse of the input unit 16 while watching the image of the first frame. Moreover, an output from another motion parameter estimation device or smoother may also be used as the initial value.

At the next step S32, the CPU 11 initializes the number of cycles k, that is, sets k=1. It declares that the initial estimation value $x_0(\hat{})$ of the state vector $x_k$ and the initial estimated error covariance value $P_0$ of the estimated error covariance $P_k$ are used as internal information of the first cycle.

At the next step S33, the processing of the filtering subroutine is carried out. The details of the filtering subroutine will be described later with reference to FIG. 19.

At step S34 after the filtering, an increment is made on k so as to set k k+1. At the next step S35, whether k has reached L (k≧L) or not is discriminated. If it is discriminated at step S35 that k has not reached L (NO), the processing returns to the filtering subroutine of step S33. If it is discriminated that k has reached K (YES), the processing goes to the next step S36.

The processing of steps S31 to S35 is so-called start-up processing. The smoother of the present embodiment generally estimates the state variable of t=k+1 from the observation value at the time point t=k+L, and in the initial state, it cannot update any state variable with respect to the observation value for t<L. Therefore, during the period of start-up, filtering is carried out instead of smoothing. Other methods for start-up are also proposed and start-up can also be realized by using the method described in the reference document. The estimation value obtained at the time of start-up is directly used as the estimation value of the smoother in this interval. Depending on the system, the loop portion of steps S33 to S35 can be omitted.

On completion of the start-up. processing, smoothing processing is carried out at step S36. The details of the smoothing subroutine will be described later with reference to FIG. 20.

At the next step S37, the CPU 11 makes an increment on the number of cycles k (k=k+1) so as to obtain the data of the next cycle.

At step S38, the CPU 11 discriminates whether or not to continue the above-described estimation processing. If it is discriminated that the estimation processing is to be continued, the processing returns to step S36.

If it is discriminated that the estimation processing is not to be continued, the processing ends. The end of the processing may be discriminated, for example, by input from the user. If the data is image data, the end of the processing may be determined on the basis of the completion of processing of the last frame. Alternatively, the end of the processing may be determined in accordance with the restraints of hardware or software such as the memory being full.

At steps S36, S37 and S38, if k exceeds L, the smoothing processing is repeated until the end condition is met.

Figure 18:
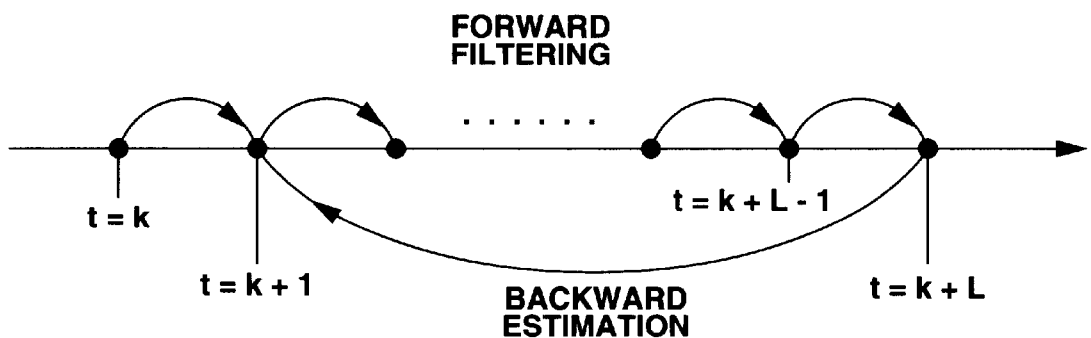
FIG. 18 illustrates the concept of smoothing in the smoother.

FIG. 18 is a schematic view for-explaining the smoothing processing. In FIG. 18, on the assumption that t=k+1 is a predetermined position on the time base, the state variable at the predetermined position (k+1) is to be estimated. First, as the first filtering processing, the update value of the state variable at the time point t=k+1 is found, using the estimation value at the time point t=k immediately before the predetermined position and the observation value at the time point t=k+1. Then, as the second filtering processing, that is, as the filtering processing at the time point t=k+2, the update value of the state variable at the time point t=k+2 is found, using the estimation value at the time point t=k+1 immediately before and the observation value at the time point t=k+2. Similarly, the filtering processing for finding the update value at the target time point by using the update value found in the filtering processing immediately before and the observation value at the target time point is repeated L times while making an increment on the number of cycles k. Thus, the update values of the state variable are sequentially found up to the time point t=k+L. In this case, L represents the length of the fixed lag. After that, backward estimation is carried out on the basis of the update value found in each round of filtering processing, thereby finding the estimation value at the ultimate predetermined time point (t=k+1). The update value obtained in the filtering processing is not yet used as the estimation value. As the backward estimation is carried out after filtering (forward update) is carried out L times, the estimation value at the predetermined position (t=k+1) on the time base is outputted.

The estimation value of the state variable obtained by the smoother is expressed by the following formula (34). The update value of the filter used in the forward update is expressed by the formula (4).

$$\hat{x}_k^* \quad (34)$$

The backward estimation is carried out in accordance with the following equation (35). $B_{k+1+L}$ in the equation (35) is calculated in accordance with the following equation (36).

$$x^*_k = A_k x^*_k + Q_k (A^T_k)^{-1} P^{-1}_k (x^*_k - x_k) + B_{k+1+L} K_{k+1+L} (y_{k+1+L} - H_{k+1+L} A_{k+L} x_{k+L}) \quad (35)$$

$$B_{k+l+L} = \prod_{i=k+l}^{k+L} \left( P_i A_i^T P_{i+1}^{-1} \right) \quad (36)$$

As described above, the estimation value obtained at the time of start-up of steps S31 to S34 in the flowchart of FIG. 16 is directly used as the estimation value in smoothing of the next step S36, as expressed by the following equation (37).

$$\hat{x}_k^* = \hat{x}_k \quad (37)$$

The filtering subroutine of step S33 will now be described with reference to FIG. 19.

At the first step S101 of FIG. 19, the CPU 11 calculates and predicts the state vector $x_{(k+1)}(\hat{\ })$ and the estimated error covariance $P_{(k+1)}$ of the (k+1)th cycle, using the updated state vector $x_k(\hat{\ })$ and estimated error covariance $P_k$ of the k-th cycle. The specific example of this prediction processing is as described above with reference to the flowchart of FIG. 13.

At step S102, in parallel to step S101, the CPU 11 obtains the observation data of the k-th cycle from the data stored in the data memory 13. This observation data may be a sensor signal. In such case, an interface for the sensor signal is provided in the input unit 16 of FIG. 6. Alternatively, by performing tracking (feature point tracking or area tracking) or segmentation (area division) on images of respective frames of an image sequence, position information and posture information of each joint and information of the combination thereof may be obtained and used as observation data. In such case, an interface with a device for carrying out tracking or segmentation is provided in the input unit 16. In the case of constructing a system for obtaining information from an image as described above on the same hardware, an interface with a video equipment such as a camera or a video deck is provided as the input unit 16, and the above-described system may share the elements of the multi-joint motion estimation device 1. The processing of step S102 corresponds to the input from INPUT in the data-flow diagram of FIG. 17, which means that an external system provides data to the present system.

The next step S103 is an update subroutine, where the CPU 11 updates the data stored in the data memory 13. The details of the update processing are as shown in the flowchart of FIG. 10 and therefore will not be described further.

At step S104 next to the update subroutine of step S103, the CPU 11 causes the data memory 13 or the external storage unit 17 to store the updated state vector $x_k$ and estimated error covariance $P_k$ of the k-th cycle. In the data-flow diagram of FIG. 17, the state variable updated in the first update process ud and the second update process opt is stored in the data storage sd, and the estimated error covariance updated in the first update process ud is indicated by an arrow toward the data storage eec.

If there is no need to save the state in real-time processing, this step S104 is not necessary. In order to show the updated state variable to the user, a routine for visualizing the contents of the updated state variable at step S51 and displaying the visualized data at step S52 as shown in FIG. 11 may be inserted into the flowchart of FIG. 19. The visualized information obtained at step S51 of FIG. 11 is written into the frame memory 14 of FIG. 6 and outputted to the image display unit 15 at step S52.

After step S104, the filtering subroutine of FIG. 19 ends and the processing returns to the main routine.

The smoothing subroutine of step S36 in the flowchart of FIG. 16 will now be described with reference to FIG. 20.

At the first step S61 of the smoothing subroutine of FIG. 20, the parameter t expressing the time in this subroutine is initialized by k.

The next step S62 is a filtering subroutine, where the filtering processing described with reference to FIG. 19 is carried out similarly to step S33 of FIG. 16.

At step S63, an increment is made on the parameter t expressing the time (t=t+1), and at the next step S64, it is discriminated whether t has reached k+L or not (t=k+L or not). If t has not reached k+L, the processing returns to the filtering subroutine of step S62. If t has reached k+L, the processing goes to step S65.

At step S65, backward estimation is carried out. The state variable at the time t=k+L is estimated in accordance with the equation (35) using the covariance used in the repeated forward estimation, the observation value at the time t=k+L and the estimation value obtained by smoothing at the time k. $B_{k+1+L}$ in the equation (35) is calculated in accordance with the following equation (36). In the data-flow diagram of FIG. 17, it is calculated by using the transition matrix ($A_k$) found in accordance with the equation (15) in the forward estimation and stored in the data storage, and the predicted estimated error covariance peec the updated estimated error covariance eec which are also obtained in the forward estimation and stored in the data storage.

What is carried out in the smoothing subroutine is as described with reference to FIG. 18. In addition to the above-described smoothing method, there are other methods for realizing a fixed-lag smoother. For example, there is often used a method which grouping L units of state variables continuous in time series into one vector and the carried out filtering with respect to this vector. It is also possible to construct a system by application to the other smoothing method described in the reference documents. Although this embodiment employs a fixed-lag smoother, it can be easily expanded to a fixed-point smoother or a fixed-interval smoother.

In the above-described embodiment, the updated state vector x is recorded at step S104. However, if real-time processing need not be carried out, step S54 may be omitted. Also, steps S51 and S52 as shown in FIG. 11 may be inserted after step S103 or after step S104, so as to visualize the contents of the updated state vector x at step S51 for recording the visualized state vector x, and to display the visualized data on the image display unit 15 at step S52. Thus, the user can immediately confirm the prediction and update of the state vector on the image display unit 15.

A fourth embodiment of the information processing method and device according to the present invention will now be described with reference to the drawings.

In the fourth embodiment of the present invention, further functions are added to the third embodiment described with reference to FIGS. 10, 11 and 16 to 20. The fourth embodiment is adapted for estimating the motion information of a multi-joint object having restraining conditions by using an estimation method which holds the torque information of the multijoint object and which assumes that the fluctuation of the torque information has normal distribution. The fourth embodiment includes a step of holding the torque information of the multi-joint object and a step of calculating the angular velocity from other motion information and the torque information.

In the smoother using the recursive estimation filter having the boundary conditions, more precise estimation can be carried out by approximating the prediction model (process model) to the actual physical behavior.

Specifically, in the fourth embodiment, the torque of each joint is held as a state variable and the torque is assumed to be constant. For example, the angle, angular velocity and torque of each joint are provided as elements of the state variable that should be constantly held inside and is employed as the estimation target. It is expressed by a vector and mathematically expressed by the equation (17). The combination of elements of the state vector described in the present embodiment is simply an example. For example, it is also possible to employ the length between joints as an element, then estimate it, and thus improve the measuring accuracy.

Figure 21:
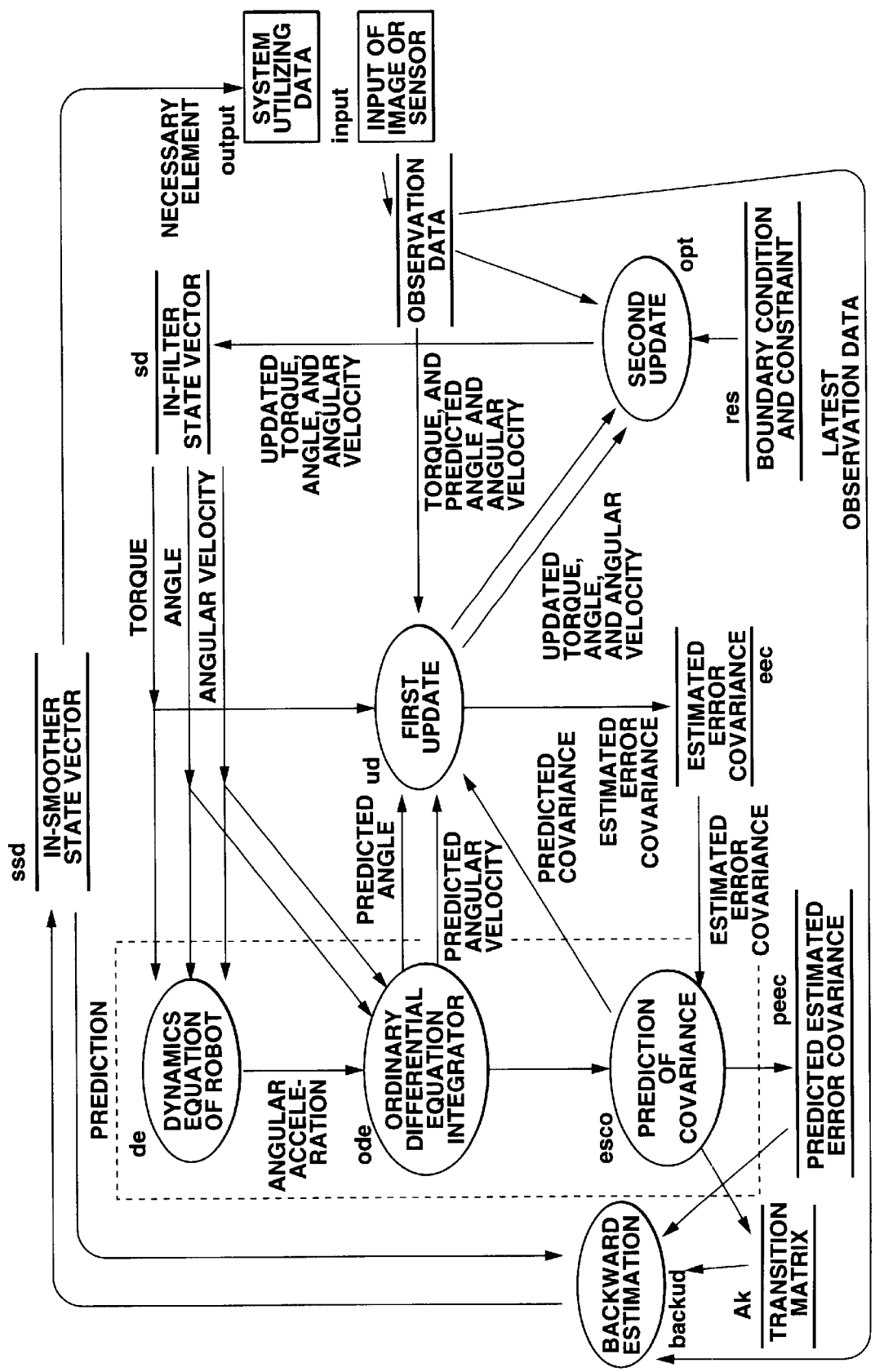
FIG. 21 shows the data flow for explaining the operation of a fourth embodiment of the present invention.

FIG. 21 shows the data-flow diagram of the fourth embodiment of the present invention. The main part of the operation is similar to that of the flowchart of FIG. 16, but the prediction subroutine of step S101 in the filtering subroutine shown in FIG. 19 is the subroutine of FIG. 13. The operation of the prediction subroutine shown in FIG. 13 is as described above and the main part of the operation of the fourth embodiment shown in FIG. 21 is similar to that of the third embodiment described with reference to FIGS. 10, 11 and 16 to 20. Therefore, the operation of the fourth embodiment will not be described further in detail.

Meanwhile, in the smoothing processing in the above-described embodiment, forward filtering processing is sequentially carried out step by step from the predetermined position (t=k+L) on the time base, and at the time point (t=k+L) after repetition of the forward filtering L times, backward estimation as expressed by the equation (38) is carried out once, as shown in FIG. 18. Thus, the estimation value of the state variable at the predetermined position (t=k+L) is obtained. Other than such method, estimation or update which returns step by step from the time point t=k+L may be repeated as backward estimation, as shown in FIG. 22.

Figure 22:
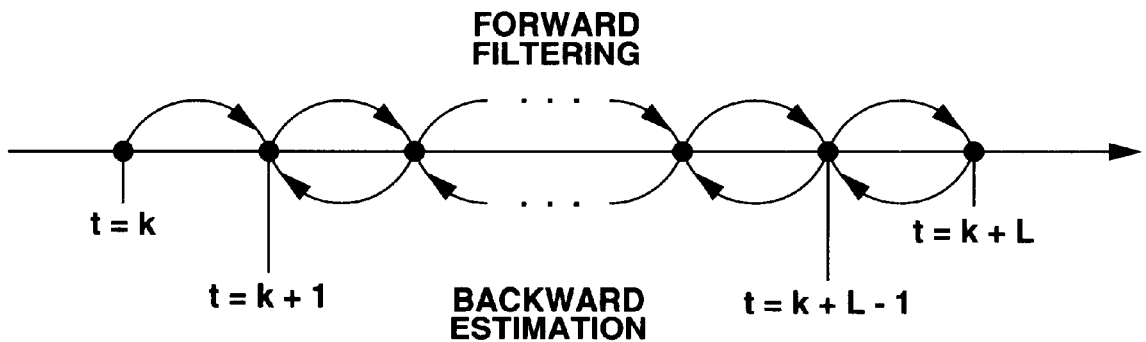
FIG. 22 illustrates the concept of another example of smoothing in the smoother.

Specifically, in the smoothing shown in FIG. 22, after the forward filtering processing is sequentially repeated L times in a step-by-step manner from the predetermined position (t=k+L) on the time base, the backward estimation (strictly, the processing is "backward update". because the update value obtained during the processing is not the ultimate estimation value) expressed by the equation (38) is repeated. When the value $x_{k+1}*(\hat{})$ at the time point t=k+L is obtained, this value is determined as the estimation value obtained by the smoother.

$$x^*_i + x_i = P_i A^T_i P^{-1}_i [x^*_{i+1} - x^-_{i+1}] (i=k+L-1, k+L-2, \ldots, k+1) \quad (38)$$

In this case, the estimated error covariance $P^*_i$ of the smoother is also sequentially "updated backward" in accordance with the following equation (39). When the value $P^*_{k+1}$ at the time point t=k+1 is obtained, this covariance is used as the value $P_{k+1}$ to continue estimation.

$$P^*_i = P_i + P_i A^T_i P^{-1}_{i+1} (P^*_{i+1} - P^-_{i+1})(P_i A^T_i P^{-1}_{i+1})^T (i=k+L-1, k+L-2, \ldots, k+1) \quad (39)$$

Figure 23:
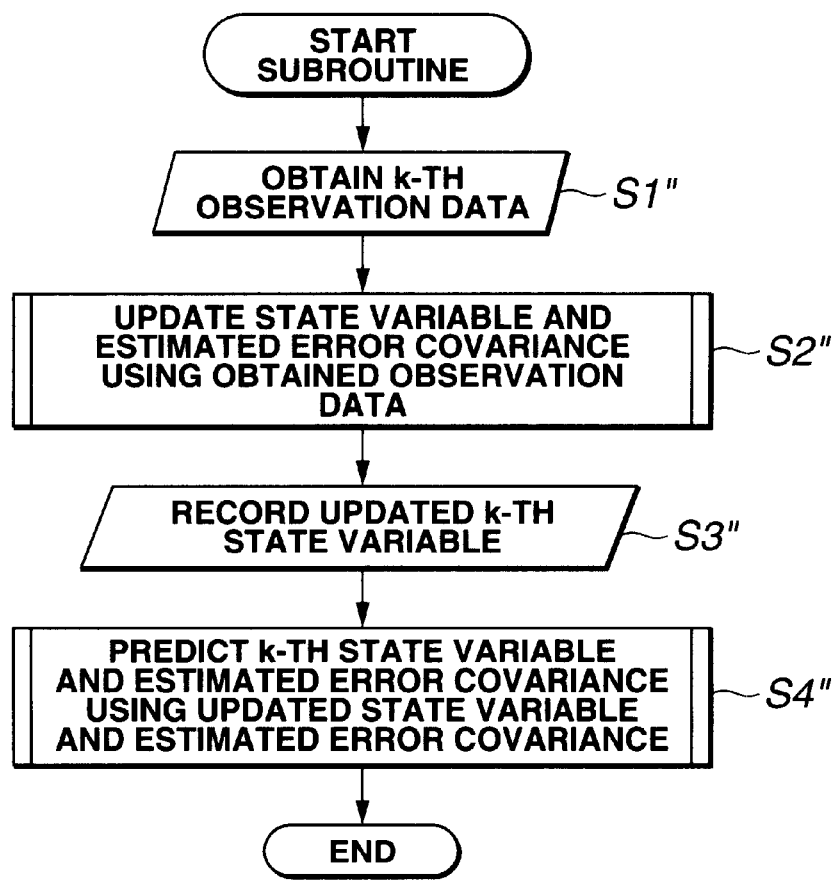
FIG. 23 is a flowchart for explaining the operation of a modification of filtering processing used in the embodiment of the present invention.

FIG. 23 shows a modification of the flowchart of FIG. 19. In FIG. 23, the k-th observation is obtained at step S1". At step S2", the state variable and the estimated error covariance are updated by using the obtained observation value, and at step S3", the updated k-th state variable is recorded. At step S4", the (k+1)th state variable and estimated error covariance are predicted by using the updated state variable and estimated error covariance. After step S4", the processing returns to the main routine. Filtering is also possible in accordance with such procedures.

In the above description, estimation is carried out on the assumption that the observation data has already been obtained. However, the smoother 2 for multi-joint motion estimation or the like shown in FIG. 6 may also be used for generation of the observation data. The concept of such case is shown in FIG. 15.

As shown in FIG. 15, information related to the joint is taken out from an inputted image by a device 61 such as a tracker for taking out the information related to the joint, and an estimation value is predicted by a multi-joint motion estimation device 62 to which the smoother 2 of FIG. 6 is applied. From the predicted estimation value, feedback is carried out to the device 61 for taking out the information related to the joint. Thus, the observation accuracy van be improved.

In summary, as the above-described Kahnan filter is used as the recursive filter for estimation, estimation is carried out by the operation as shown in FIG. 14. In the embodiment of the present invention, the state vector to be estimated includes the angle, angular velocity and torque of each joint, as its elements, as expressed by the formula (19). The process model for prediction by the Kalman filter is as expressed by the equation (1). In the case of a nonlinear system, the equation (11) is used. In the embodiment of the present invention, since the estimation target is nonlinear, the equation (32) corresponding to the equation (11) is used. The step of finding the acceleration in accordance with the equation (29) and the equation (32) are summarized into the equation (33). This is the process model expressed by the equation (11).

Hereinafter, a system embodying the concept of FIG. 15 will be described with reference to FIGS. 24 and 25. FIG. 24 shows an exemplary structure of a motion capture system in which the parameter estimation device 1 or the smoother 2 of FIG. 6 is applied to a multi-joint motion estimation device 70. Image data outputted from a video camera 71 is inputted to the multi-joint motion estimation device 70. The state vector is estimated and inputted as a three-dimensional motion parameter to a 3-D animation production device 72. The 3-D animation production device 72 produces 3-D animation by using the motion parameter supplied thereto as 3-D animation data.

The input to the multi-joint motion estimation device 70 may be an input from a video tape recorder or the like, instead of the output from the video camera 71. Information of a video sequence which is binarized in advance may be inputted via the external storage unit 17 of FIG. 6.

FIGS. 25A to 25C show an exemplary system used as a user interface equipment in which the parameter estimation device 1 or the smoother 2 of FIG. 6 is applied to the multi-joint motion estimation device 70. From image information inputted from the video camera 71 as shown in FIG. 25A, that is, from image information of a user 41 picked up by the video camera 71 as shown in FIG. 25B, three-dimensional motion information of the joint of the user 41 is estimated by the multi-joint motion estimation device 70, then converted into a command, and supplied as a control signal to a control target equipment 75, for example, to a television receiver 76 as shown in FIG. 25C. The control target equipment 75 operates in accordance with the control signal.

The system of FIG. 12 is effective for application to an equipment of the entertainment field, for example, a game machine as the control target equipment 75.

In the parameter estimation device 1 or the smoother 2 shown in FIG. 6, the processing program in accordance with the estimation method is stored in the program memory 12. However, the processing program may also be stored onto an optical disc such as CD-ROM, DVD-ROM, CD-R, CD-RW or DVD-RAM, or a magneto-optical disc such as MO. The processing program may also be stored onto a magnetic disk such as a hard disk or a floppy disk. Alternatively, it may be stored into a semiconductor memory such as a memory stick. In any case, motion estimation with higher accuracy is made possible by reading out and executing the processing program related to the motion estimation method from the supply medium for supplying the processing program.

As described above, in the case where the parameter estimation device 1 or the smoother 2 of FIG. 6 is applied to the multi-joint motion estimation device, the motion is predicted with the torque of each joint held as a state variable and on the assumption that the fluctuation of the torque is constant. Therefore, the motion can be accurately predicted.

In the above-described embodiments, the angle, angular velocity and torque of each joint are used as elements of the state vector x. However, the length of each joint may also be used as an element. Thus, the accuracy of motion estimation can be improved further.

According to the above-described embodiments of the present invention, the accuracy of estimation in the direction of depth can be improved, which was conventionally difficult to achieve in motion estimation from a single-view image. Therefore, it can be applied for the single-camera construction of an optical motion capture system (motion measurement system), which currently requires a plurality of cameras. Thus, the complicated operation such as calibration is not necessary. Also, three-dimensional motions of persons and animals can be reproduced from archives such as the past movie films and video pictures.

Also, since the prediction model more resembles the actual model, robust estimation can be carried out even in the case where there is a large change in the data parameter (state variable) of the sampled continuous data. For the same reason, the accuracy of estimation can be improved. These effects can be obtained not only in the case where a single-view image sequence is used as an input but also in the case where images from a plurality of cameras or inputs from other sensors such as an angular speedometer and an angular accelerometer are used.

Since it is possible to realize more accurate estimation from a smaller amount of information as a source, it can be applied to interfaces for computers and home electronic products.

These effects can be obtained not only in the case where a single-view image sequence is used as an input but also in the case where images from a plurality of cameras or inputs from other sensors such as an angular speedometer and an angular accelerometer are used.

Since it is possible to realize more accurate estimation from a smaller amount of information as a source, it can be applied to interfaces for computers and home electronic products.

The present invention is not limited to the above-described embodiments and it is a matter of course that various modifications can be effected without departing from the scope of the present invention.

What is claimed is:

1. An information processing method for estimating a state variable of a target on the basis of a previously estimated state variable and an observation value, the method comprising:

a prediction step of finding a prediction value of a next state variable on the basis of the previously estimated state variable; and an update step of updating the state variable on the basis of the prediction value obtained by the prediction step and the observation value and outputting an estimation value;

the update step including a step of finding an update value which minimizes the Mahalanobis distance from the prediction value in the state space and the square sum or the absolute value sum of the Mahalanobis distance from the observation value in the observation space under a boundary condition.

2. The information processing method as claimed in claim 1, wherein the update step includes:

a step of finding the update value of the state variable on the basis of the prediction value obtained by the prediction step and the observation value;

a step of checking whether the update value meets the boundary condition or not; and a step of finding a new update value which minimizes the Mahalanobis distance from the prediction value in the state space and the square sum or the absolute value sum of the Mahalanobis distance from the observation value in the observation space under the boundary condition, when the update value does not meet the boundary condition.

3. The information processing method as claimed in claim 2, wherein quadratic programming is used for finding the new update value which minimizes the square sum or absolute value sum of the Mahalanobis distance under the boundary condition.

4. The information processing method as claimed in claim 2, wherein nonlinear programming is used for finding the new update value which minimizes the square sum or absolute value sum of the Mahalanobis distance under the boundary condition.

5. The information processing method as claimed in claim 1, wherein the state variable includes motion information and torque information of the target.

6. An information processing device for estimating a state variable of a target on the basis of a previously estimated state variable and an observation value, the device comprising:

prediction means for finding a prediction value of a next state variable on the basis of the previously estimated state variable; and update means for updating the state variable on the basis of the prediction value obtained by the prediction means and the observation value and outputting an estimation value;

the update means including a function for finding an update value which minimizes the Mahalanobis distance from the prediction value in the state space and the square sum or the absolute value sum of the Mahalanobis distance from the observation value in the observation space under a boundary condition.

7. The information processing device as claimed in claim 6, wherein the update means includes a function for finding the update value of the state variable on the basis of the prediction value obtained by the prediction means and the observation value, checking whether the update value meets the boundary condition or not, and finding a new update value which minimizes the Mahalanobis distance from the prediction value in the state space and the square sum or the absolute value sum of the Mahalanobis distance from the observation value in the observation space under the boundary condition, when the update value does not meet the boundary condition.

8. The information processing device as claimed in claim 7, wherein quadratic programming is used for finding the new update value which minimizes the square sum or absolute value sum of the Mahalanobis distance under the boundary condition.

9. The information processing device as claimed in claim 7, wherein nonlinear programming is used for finding the new update value which minimizes the square sum or absolute value sum of the Mahalanobis distance under the boundary condition.

10. The information processing device as claimed in claim 6, wherein the state variable includes motion information and torque information of the target.

11. A program supply medium which supplies an information processing program for estimating a state variable of a target on the basis of a previously estimated state variable and an observation value, the program causing an information processing device to carry out processing comprising:

a prediction step of finding a prediction value of a next state variable on the basis of the previously estimated state variable; and an update step of updating the state variable on the basis of the prediction value obtained by the prediction step and the observation value and outputting an estimation value;

the update step including a step of finding an update value which minimizes the Mahalanobis distance from the prediction value in the state space and the square sun or the absolute value sum of the Mahalanobis distance from the observation value in the observation space under a boundary condition.

12. The program supply medium as claimed in claim 11, wherein the update step includes:

a step of finding the update value of the state variable on the basis of the prediction value obtained by the prediction step and the observation value;

a step of checking whether the update value meets the boundary condition or not; and a step of finding a new update value which minimizes the Mahalanobis distance from the prediction value in the state space and the square sum or the absolute value sum of the Mahalanobis distance from the observation value in the observation space under the boundary condition, when the update value does not meet the boundary condition.

13. An information processing method for estimating a state variable at a predetermined position on the time base with respect to a target on the basis of a previously estimated state variable and an observation value, the method comprising the steps of:

sequentially repeating filtering processing L times, including processing for finding a prediction value of the state variable at that time point on the basis of an update value of a state variable immediately before and for finding an update value which minimizes the Mahalanobis distance from the prediction value in the state space and the square sum or the absolute value sum of the Mahalanobis distance from the observation value in the observation space under a boundary condition; and estimating the state variable at the predetermined position on the time base on the basis of the value obtained in the filtering processing of each time.

14. The information processing method as claimed in claim 13, wherein the filtering processing is sequentially carried out over a predetermined range from the predetermined position on the time base to the future.

15. The information processing method as claimed in claim 13, wherein the filtering processing includes:

a prediction step of finding the prediction value of the state variable at that time point is found on the basis of the update value of the state variable immediately before;

a step of finding the update value of the state variable on the basis of the prediction value obtained by the prediction step and the observation value at that time point;

a step of checking whether the update value meets the boundary condition or not; and a step of finding a new update value which minimizes the Mahalanobis distance from the prediction value in the state space and the square sum or the absolute value sum of the Mahalanobis distance from the observation value in the observation space under the boundary condition, when the update value does not meet the boundary condition.

16. The information processing method as claimed in claim 15, wherein quadratic programming is used for finding the new update value which minimizes the square sum or absolute value sum of the Mahalanobis distance under the boundary condition.

17. The information processing method as claimed in claim 15, wherein nonlinear programming is used for finding the new update value which minimizes the square sum or absolute value sum of the Mahalanobis distance under the boundary condition.

18. The information processing method as claimed in claim 13, wherein the state variable includes motion information and torque information of the target.

19. An information processing device for estimating a state variable at a predetermined position on the time base with respect to a target on the basis of a previously estimated state variable and an observation value, the device comprising:

filtering means for sequentially repeating filtering processing L times, including processing for finding a prediction value of the state variable at that time point on the basis of an update value of a state variable immediately before and for finding an update value which minimizes the Mahalanobis distance from the prediction value in the state space and the square sum or the absolute value sum of the Mahalanobis distance from the observation value in the observation space under a boundary condition; and means for estimating the state variable at the predetermined position on the time base on the basis of the value obtained in the filtering processing of each time.

20. The information processing device as claimed in claim 19, wherein the filtering processing by the filtering means is sequentially carried out over a predetermined range from the predetermined position on the time base to the future.

21. The information processing device as claimed in claim 19, wherein the filtering means includes:

prediction means for finding the prediction value of the state variable at that time point is found on the basis of the update value of the state variable immediately before;

means for finding the update value of the state variable on the basis of the prediction value obtained by the prediction means and the observation value at that time point;

means for checking whether the update value meets the boundary condition or not; and means for finding a new update value which minimizes the Mahalanobis distance from the prediction value in the state space and the square sum or the absolute value sum of the Mahalanobis distance from the observation value in the observation space under the boundary condition, when the update value does not meet the boundary condition.

22. A program supply medium which supplies an information processing program for estimating a state variable at a predetermined position on the time base with respect to a target on the basis of a previously estimated state variable and an observation value, the program causing an information processing device to execute processing comprising the steps of:

sequentially repeating filtering processing L times, including processing for finding a prediction value of the state variable at that time point on the basis of an update value of a state variable immediately before and for finding an update value which minimizes the Mahalanobis distance from the prediction value in the state space and the square sum or the absolute value sum of the Mahalanobis distance from the observation value in the observation space under a boundary condition; and estimating the state variable at the predetermined position on the time base on the basis of the value obtained in the filtering processing of each time.

23. The program supply medium as claimed in claim 22, wherein the filtering processing is sequentially carried out over a predetermined range from the predetermined position on the time base to the future.

24. The program supply medium as claimed in claim 22, wherein the filtering processing includes:

a prediction step of finding the prediction value of the state variable at that time point is found on the basis of the update value of the state variable immediately before;

a step of finding the update value of the state variable on the basis of the prediction value obtained by the prediction step and the observation value at that time point;

a step of checking whether the update value meets the boundary condition or not; and a step of finding a new update value which minimizes the Mahalanobis distance from the prediction value in the state space and the square sum or the absolute value sum of the Mahalanobis distance from the observation value in the observation space under the boundary condition, when the update value does not meet the boundary condition.

25. An information processing method for estimating a state variable at a predetermined position on the time base with respect to a target on the basis of an estimation value of a previously estimates state variable and an observation value, the method comprising the steps of:

sequentially repeating filtering processing L times, including processing for finding a prediction value of motion information and a prediction value of torque of the target at that time point on the basis of an update value of motion information and an update value of torque of the target immediately before and for finding the update value of motion information and the update value of torque at that time point on the basis of the resultant prediction values, the observation value of motion information of the target and the observation value of torque; and estimating the state variable at the predetermined position on the time base on the basis of the value obtained in the filtering processing of each time.

26. The information processing method as claimed in claim 25, wherein the filtering processing is sequentially carried out over a predetermined range from the predetermined position on the time base to the future.

27. An information processing device for estimating a state variable at a predetermined position on the time base with respect to a target on the basis of an estimation value of a previously estimates state variable and an observation value, the device comprising:

means for sequentially repeating filtering processing L times, including processing for finding a prediction value of motion information and a prediction value of torque of the target at that time point on the basis of an update value of motion information and an update value of torque of the target immediately before and for finding the update value of motion information and the update value of torque at that time point on the basis of the resultant prediction values, the observation value of motion information of the target and the observation value of torque; and means for estimating the state variable at the predetermined position on the time base on the basis of the value obtained in the filtering processing of each time.

28. The information processing device as claimed in claim 27, wherein the filtering processing by the filtering means is sequentially carried out over a predetermined range from the predetermined position on the time base to the future.

29. A program supply medium which supplies an information processing program for estimating a state variable at a predetermined position on the time base with respect to a target on the basis of an estimation value of a previously estimates state variable and an observation value, the program causing an information processing device to execute processing comprising the steps of:

sequentially repeating filtering processing L times, including processing for finding a prediction value of motion information and a prediction value of torque of the target at that time point on the basis of an update value of motion information and an update value of torque of the target immediately before and for finding the update value of motion information and the update value of torque at that time point on the basis of the resultant prediction values, the observation value of motion information of the target and the observation value of torque; and estimating the state variable at the predetermined position on the time base on the basis of the value obtained in the filtering processing of each time.

30. The program supply medium as claimed in claim 29, wherein the filtering processing is sequentially carried out over a predetermined range from the predetermined position on the time base to the future.

* * * * *